United States Patent

Wakata et al.

[11] Patent Number: 5,130,998
[45] Date of Patent: Jul. 14, 1992

[54] LASER DEVICE WITH OSCILLATION WAVELENGTH CONTROL

[75] Inventors: Hitoshi Wakata; Atsushi Sugitatsu, both of Amagasaki, Japan

[73] Assignee: Mitsubhiski Denki Kabushiki Kaisha, Tokyo, Japan

[21] Appl. No.: 658,475

[22] Filed: Feb. 20, 1991

[30] Foreign Application Priority Data

| Feb. 21, 1990 | [JP] | Japan | 2-41585 |
| Jun. 6, 1990 | [JP] | Japan | 2-147935 |
| Oct. 11, 1990 | [JP] | Japan | 2-274083 |

[51] Int. Cl.$^5$ ............................................. H01S 3/13
[52] U.S. Cl. ............................ 372/32; 372/38; 372/108
[58] Field of Search ............ 372/32, 29, 38, 33, 372/108, 98

[56] References Cited

U.S. PATENT DOCUMENTS

| 4,839,614 | 6/1989 | Hill et al. | 372/32 |
| 4,914,662 | 4/1990 | Nakatani et al. | 372/32 |
| 4,947,398 | 8/1990 | Yasuda et al. | 372/32 |
| 4,975,919 | 12/1990 | Amada et al. | 372/32 |
| 4,977,563 | 11/1990 | Nakatani et al. | 372/32 |

FOREIGN PATENT DOCUMENTS 1-205488  8/1980  Japan .

Primary Examiner—Léon Scott, Jr.
Attorney, Agent, or Firm—Rothwell, Figg, Ernst & Kurz

[57] ABSTRACT

Laser devices including a rough and a fine adjustment etalons are controlled for wavelength stabilization. Further, a power monitoring mechanism may be provided for measuring the output power of the laser beam, and the rough adjustment etalon is selectively controlled in response to the power monitoring mechanism or to the calculation means. Alternatively, a separate light source oscillating at a wavelength different from the oscillation wavelength of the laser resonator emits light which is split into two parts by a beam splitter. The beams of light emitted from the light source and reflected by the rough adjustment etalon are received by a pair of photosensors, and the rough adjustment etalon is controlled so as to minimize the differential output of the two photosensors.

9 Claims, 16 Drawing Sheets (VAR. OF REFLECTED LIGHT INTENSITY)

LASER DEVICE WITH OSCILLATION WAVELENGTH CONTROL

BACKGROUND OF THE INVENTION

This invention relates to laser devices, and more particularly to mechanism for stabilizing the oscillation wavelength of the laser beams of laser devices.

Laser devices such as excimer lasers and some of the solid state lasers including semiconductor lasers have relatively wide oscillation bandwidths. Thus, when laser beams of such laser devices are utilized for fine machining, etc., the chromatic aberrations generated by converging lenses cause problems. It has therefore been proposed to insert etalons within the laser resonator of the laser device so as to narrow the bandwidth of the laser beam and obtain a substantially monochromatic laser beam.

FIG. 1 shows such a laser device which is disclosed, for example, in Japanese Laid-Open Patent Application (Kohai) No. 1-205488. A laser resonator 1 consists of a laser medium 2, a totally reflective mirror 3, and a partially reflective mirror 4. Within the laser resonator 1 there are disposed a rough adjustment etalon 5 which roughly selects and narrows the bandwidth of the laser beam, and a fine adjustment etalon 6 which further narrows and determines the wavelength of the laser beam. As shown in FIG. 2, each of these etalons comprises a pair of parallel transparent plates 5a opposing each other across a gap d. A reflective coating 5b is formed on the opposing surface of each of the plates 5a. The central transmission wavelength of the etalons can be adjusted by changing the gap d between the plates 5a or the angle of the etalons with respect to the laser beam. The laser beam 7 is outputted from the laser resonator 1 after being narrowed in bandwidth via the rough adjustment etalon 5 and fine adjustment etalon 6. A first interference fringe detector 9 detects the interference fringes formed by the laser beam 7 reflected by the partially reflective mirror 8. As shown in FIG. 3, the first interference fringe detector 9 comprises: an integrator 10 for weakening and diffusing the light for forming the interference fringes, an etalon 11, a lens 12, an imaging element 13 for detecting the positions where the light concentrates, and an image processing unit 14. A first etalon control mechanism 15 adjusts the transmission wavelength of the fine adjustment etalon 6 by changing the gap length d or the angle of the fine adjustment etalon 6 so as to adjust the interference fringes to the predetermined interference fringe pattern of a laser beam having a predetermined oscillation wavelength.

A light source 16 emits light the bandwidth of which is narrowed only by means of the rough adjustment etalon 5. The light pencil 18 emitted from the light source 16 is converged by a converging lens 17 and goes through the rough adjustment etalon 5 to be narrowed in its bandwidth. A second interference fringe detector 20 detects the interference fringes formed by the light pencil 18 emitted from the light source 16 after transmitting through the rough adjustment etalon 5 and reflecting at the reflection mirror 19. As shown in FIG. 3, the second interference fringe detector 20 comprises a lens 21 for forming the interference fringes, an imaging element 22 for detecting the positions where the light is concentrated, and an image processing unit 23. The interference fringes formed on the imaging element 22 within the second interference fringe detector 20 are generated by the light 18 the bandwidth of which is narrowed only via the rough adjustment etalon 5. A second etalon control mechanism 24 controls and changes the transmission wavelength of the rough adjustment etalon 5 by adjusting the gap length d or the angle of the rough adjustment etalon 5 such that the interference fringes form in the second interference fringe detector 20 are adjusted to the interference fringe pattern corresponding to a predetermined oscillation frequency of a laser beam. A selection control mechanism 25 determines whether it is necessary to control the rough adjustment etalon 5 and fine adjustment etalon 6, and when it is necessary, judges the priority of the control thereof.

The method of operation of the laser device is as follows. The light generated in the laser medium 2 bounces back and forth between the totally reflective mirror 3 and partially reflective mirror 4 and thus is amplified within the laser resonator 1. The amplified light goes out of the laser resonator 1 as the laser beam 7. Since the rough adjustment etalon 5 and fine adjustment etalon 6 are inserted within the laser resonator 1, the oscillation bandwidth is narrowed, and hence a substantially monochromatic laser beam 7 can be obtained.

The principle of bandwidth narrowing by means of the rough adjustment etalon 5 and fine adjustment etalon 6 is as follows. FIG. 4 shows the principle by which the oscillation bandwidth of laser beam is narrowed. FIG. 4(a) shows the spectral transmission characteristic of the rough adjustment etalon 5. The central transmission wavelength $\lambda m_1$ are given by the following equation (1)

$$\lambda m_1 = 2 n_1 d_1 \cos \theta_1 / m_1 \tag{1}$$

wherein:

$n_1$ represents the reflectivity of the material filling the space between the two mirror surfaces of the etalon;

$d_1$ represents the distance between the two mirror surfaces of the etalon;

$\theta_1$ represents the incident angle of the laser beam on etalon; and $m_1$ is an integer whose distinct values correspond to the respective transmission peaks of the etalon.

As can be clearly seen from this equation, the wavelengths at the transmission peaks can readily be adjusted at will by changing the values of $n_1$, $d_1$, and $\theta_1$. On the other hand, the region between the transmission peaks are known as free spectral regions (FSR), which are given by the following equation (2):

$$FSR_1 = \lambda m_1^2 / 2 n_1 d_1 \cos \theta_1 \tag{2}$$

Further, the half value width of the transmission peaks $\Delta \lambda_1$ is given by the following equation (3):

$$\Delta \lambda_1 = FSR_1 / F_1 \tag{3}$$

where $F_1$ is a value known as finesse which is determined by the performance of the etalon.

On the other hand, FIG. 4(c) shows the spectroscopic characteristic of the gain of the laser medium 2. If the etalons are not disposed within the laser resonator 1, the light is amplified in the bandwidth range where the gain is present, and hence a laser beam of wide oscillation bandwidth is generated. There is inserted, however, the rough adjustment etalon 5, and the parameters (such as $d_1$) of the rough adjustment etalon 5 are selected such that one and only one transmission peak position $\lambda m_1$ of the rough adjustment etalon 5 is within the gain region of the laser medium 2. In the case shown in the figure, the peak transmission wavelength $\lambda m_1$ of the rough adjustment etalon 5 is at the central wavelength $\lambda_0$ of the gain of the laser medium 2, and the adjacent transmission peaks are outside of the gain region of the laser medium 2. Thus, the attenuation due to the rough adjustment etalon 5 is small only in the neighborhood of the central wavelength $\lambda_0$, and the light is amplified only near at $\lambda_0$, thereby generating a laser beam narrowed in its oscillation bandwidth.

In order to limit the number of the transmission peaks present within the gain region to one, the free spectral region $FSR_1$ must be greater than a minimum determined by the width of the gain region of the laser medium 2. On the other hand, the finesse $F_1$, which is determined by the performance of etalon, is about 20 at most. Thus, the narrowing of bandwidth by means of rough adjustment etalon 5 alone has its limit. Thus, another etalon, fine adjustment etalon 6, is utilized. The spectroscopic transmission characteristic of the fine adjustment etalon 6 is shown in FIG. 4(b). A peak transmission wavelength $\lambda m_2$ thereof is turned at the central wavelength $\lambda_1$ of the laser medium 2, and the free spectral region $FSR_2$ thereof is selected at a value greater than $\Delta\lambda_1$ ($FSR_2 > \Delta\lambda_1$).

Thus, the laser bean, generated by the laser medium 2 and having the spectroscopic characteristic as shown in FIG. 4(c), is narrowed in oscillation bandwidth, as shown in FIG. 4(d), to a narrow band around the central wavelength $\lambda_0$ at which the transmission peaks of the rough adjustment etalon 5 and fine adjustment etalon 6 overlap each other. Since, the light goes back and forth many times through the etalons, the bandwidth of the laser beam is narrowed to from one half to tenth (½ to 1/10) of the bandwidth as determined by the transmission characteristics of the two etalons.

Where it is desirable to further reduce the bandwidth of the laser beam, another etalon may be inserted within the laser resonator 1.

The oscillation bandwidth of the laser beam can be narrowed as described above. When, however, the laser beam goes back and forth through the etalons in oscillation, heat is generated in the etalons, and, as a result, the etalons are deformed as shown in FIG. 5. These thermal deformations of the etalons, while not so severe as to deteriorate the performance characteristics of the etalons, do change the gap length d of the etalons, and thereby shift the central transmission wavelength thereof. The circumstance is shown in FIG. 6. FIG. 6(a) shows the spectroscopic transmission characteristic of the rough adjustment etalon 5, where the solid curve represents the characteristic immediately after the start of the oscillation, and the dotted curve represents the shifted characteristic after etalon has been heated. The relation between the shift of the transmission peak $\Delta\lambda$ and the variation $\Delta d$ of the gap d is given by the following equation (4):

$$\Delta\lambda = (\lambda m/d)\Delta d \qquad (4)$$

Incidentally, the direction of the shift of wavelength is determined by the structure of the etalon. With respect to a particular etalon, the peak transmission wavelength is shifted in a certain direction due to the thermal deformation caused by the laser beam.

Not only the peak transmission wavelength of the rough adjustment etalon 5, but also that of the fine adjustment etalon 6 is shifted as shown by the dotted curve in FIG. 6(b). The gap length of the fine adjustment etalon 6, however, is greater than that of the rough adjustment etalon 5, such that the transmission wavelength shift of the fine adjustment etalon 6 is smaller than that of the rough adjustment etalon 5. Thus, central peak transmission wavelengths $\lambda m_1$ and $\lambda m_2$ of the etalons 5 and 6 become separated from each other. The overall transmission characteristic of the two etalons 5 and 6 superposed on each other is therefore reduced, as shown in FIG. 6(c), compared with the case where the central transmission wavelengths $\lambda m_1$ and $\lambda m_2$ are equal to each other. Thus, after a long time subsequent the start of oscillation, not only the oscillation wavelength of laser beam is shifted from $\lambda_0$ to $\lambda m_2$, but also the output power is decreased. Furthermore, when the wavelength shifts are large, oscillation in another adjacent mode of the fine adjustment etalon 6 may be observed (see FIG. 6(c)).

Thus, control is effected to stabilize the oscillation wavelength of the laser beam as follows. Part of the laser beam 7 is guided to the first interference fringe detector 9 via the partially reflective mirror 8 and is diverged by the integrator 10 (see FIG. 3). Only the components of the light diverged by the integrator 10 having particular incident angles $\theta$ to the etalon 11 are transmitted therethrough to reach the lens 12. When the focal length of the lens 12 is represented by f, the light having the incident angle $\theta$ is concentrated at positions separated from the lens axis by a radial distance $f\theta$, and thereby forms a circular interference fringe. The imaging element 13 detects the positions at which the light is concentrated, and the image processing unit 14 analyses the detected result, thereby obtaining the incident angel $\theta$, from which the current oscillation wavelength of the laser beam can be calculated. The oscillation wavelength of the laser beam is determined solely by the transmission characteristic of the fine adjustment etalon 6. Thus, the fine adjustment etalon 6 is adjusted, via the first etalon control mechanism 15, with respect to its angle to the laser beam, or its gap length d, such that the central transmission wavelength of the fine adjustment etalon 6 is tuned to the predetermined wavelength. The oscillation of the laser beam is thus adjusted to the predetermined wavelength.

The control of the rough adjustment etalon 5, on the other hand, is effected as follows. The light emitted from the light source 16 reaches the rough adjustment etalon 5, and the components having particular incident angles are thereby selected. The light thus elected via the rough adjustment etalon 5 is transmitted through the fine adjustment etalon 6 without further selection. Then, the light is reflected by the reflection mirror 19, which has a particularly high reflectivity to the light at the wavelength of the light source 16, and thence is guided to the second interference fringe detector 20. The light is then converged by the lens 21, to form circular interference fringes generated by the selection of the light via the rough adjustment etalon 5 (see FIG. 3). The imaging element 22 detects the positions where the light is concentrated, and the image processing unit 23 analyses the detected result, thereby obtaining the central transmission wavelength of the rough adjustment etalon 5. The angle or the gap length of the rough adjustment etalon 5 is controlled by means of the second etalon control mechanism 24, so as to tune the central transmission wavelength of the rough adjustment etalon 5 to the predetermined wavelength.

The above laser device, however, has the following disadvantage.

FIG. 7 shows the relation between the reflectivity of the rough adjustment etalon 5 and the intensity of the interference fringes. When the reflectivity is small, the variation of the intensity of light is also small and the interference fringes are obscure. Thus, the detection of the interference fringes by the imaging element 22 is difficult, and hence an accurate control of the rough adjustment etalon 5 is difficult to perform.

Thus, in order to perform an accurate control of the rough adjustment etalon 5, the reflectivity of the reflective surface 5b of the rough adjustment etalon 5 must be made large enough to ensure a formation of distinct and clear interference fringes in the second interference fringe detector 20. Otherwise, erroneous control may ensue.

On the other hand, increasing the reflectivity of the etalon signifies increasing the number of reflective layers constituting the reflective surface 5b of the etalon. This makes the production of the etalon difficult. Further, when the reflectivity increases, the absorption of light also increases. This reduces the resistance of the etalon to the light.

SUMMARY OF THE INVENTION

It is therefore an object of this invention to provide a laser device which is capable of outputting a laser beam stabilized in the output power and oscillation wavelength. In particular, this invention aims at providing laser device in which the central transmission wavelength of the rough adjustment etalon can be controlled stably and reliably to the predetermined wavelength of the laser beam.

The above object is accomplished in accordance with the principle of this invention by a laser device which comprises: a laser resonator including a first and a second etalon having distinct transmission bandwidths, wherein a transmission bandwidth of the first etalon is narrower than a transmission bandwidth of the second etalon; measurement means for measuring an oscillation wavelength of a laser beam outputted from said laser resonator; first control means, coupled to an output of said measurement means, for controlling the first etalon such that the oscillation wavelength of the laser beam detected by the measurement means is adjusted to a predetermined wavelength; calculation means coupled to an output of said measurement means, for calculating a shift of the transmission wavelength of the second etalon in response to a measurement of the oscillation wavelength of the laser beam effected by the measurement means: and second control means, coupled to an output of the calculation means, for controlling the transmission wavelength of the second etalon to the predetermined wavelength in response to the output of the calculation means.

Alternatively, the above object is accomplished by a laser device which comprises: a laser resonator including a first and a second etalon having distinct transmission bandwidths, wherein a transmission bandwidth of the first etalon is narrower than a transmission bandwidth of the second etalon; a light source emitting light on at least one of said etalons; a photosensor means for detecting an intensity of light emitted from said light source and reflected by said one of the etalons; and control means, coupled to an output of said photosensor means, for controlling the transmission wavelength of said one of the etalons to a predetermined wavelength in response to the intensity of light detected by said photosensor means.

BRIEF DESCRIPTION OF THE DRAWINGS

The features which are believed to be characteristic of this invention are set forth in the appended claims. This invention itself, however, may best be understood from the detailed description of the preferred embodiments, taken in connection with the accompanying drawings, in which:

FIG. 19 is a view similar to that of FIG. 8, showing still another embodiment according to this invention;

In the drawings, like reference numerals represent like or corresponding parts or portions.

DETAILED DESCRIPTION OF THE PREFERRED EMBODIMENTS

Figure 1:
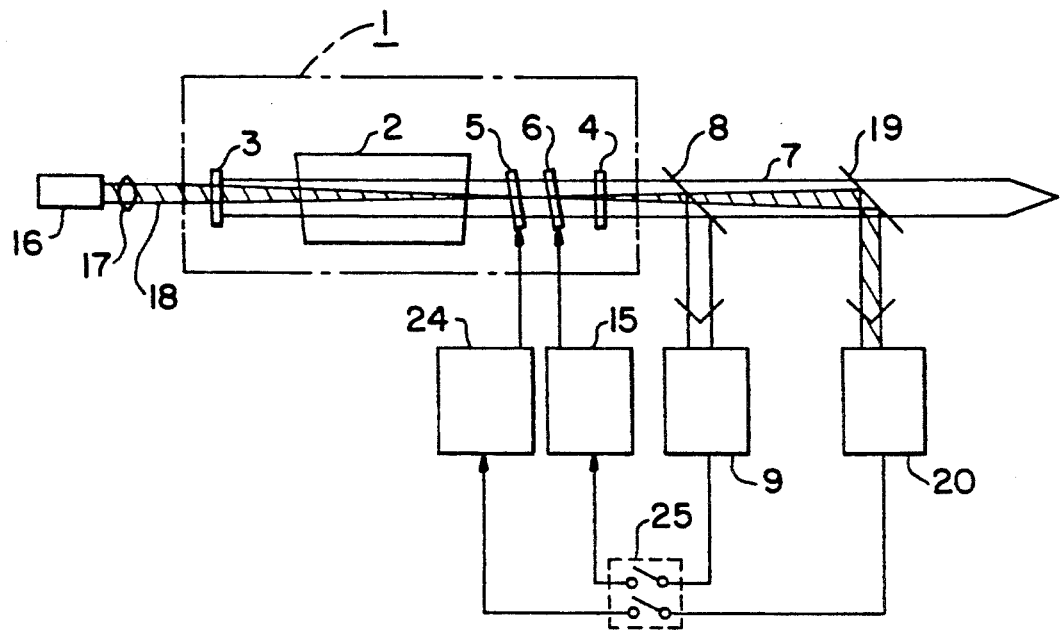
FIG. 1 is a schematic view showing the organization of a conventional laser device including etalons.
Figure 8:
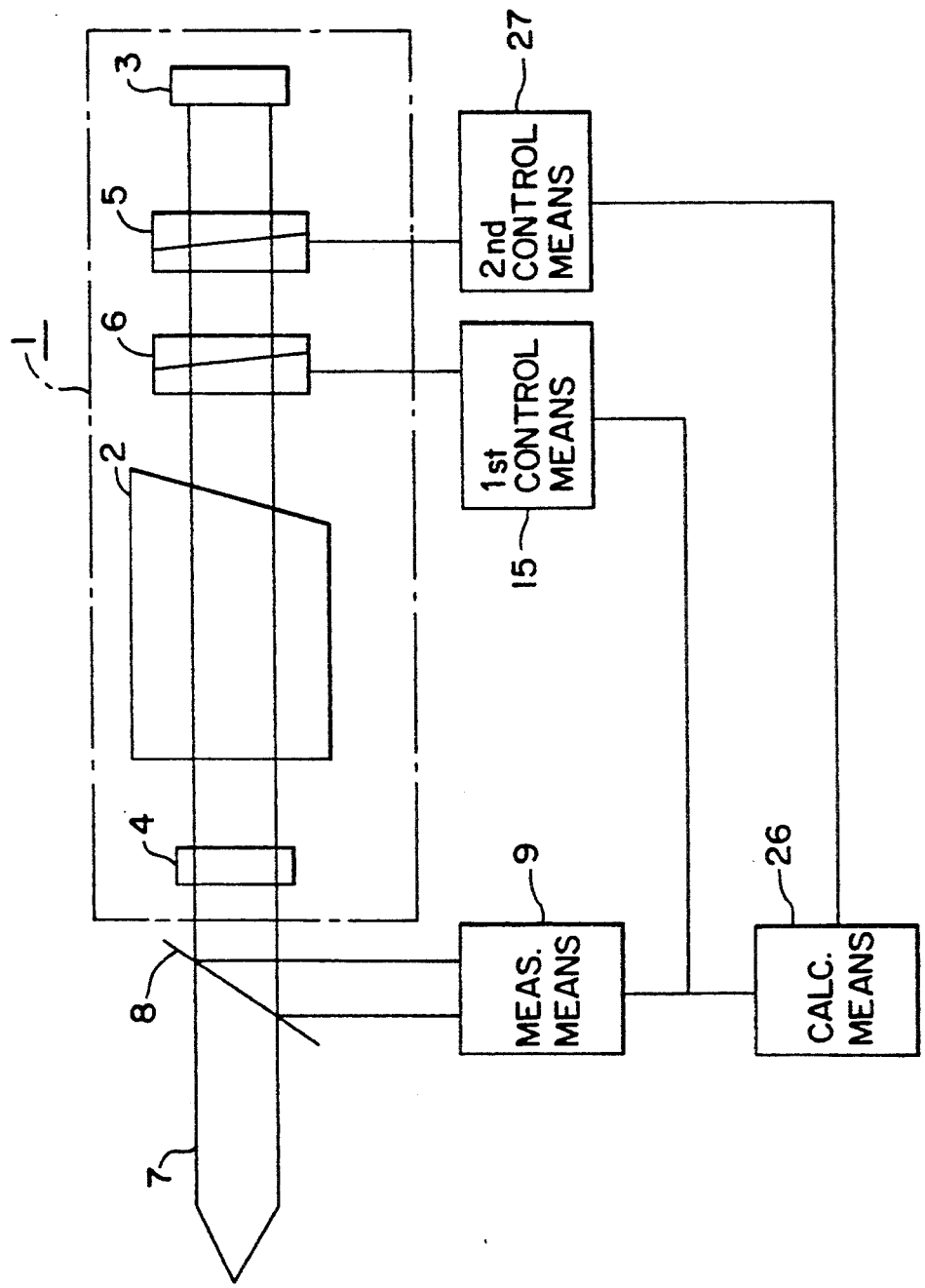
FIG. 8 is a schematic view of an embodiment according to this invention.

FIG. 8 shows a laser device according to an embodiment of this invention, the fundamental structure of which is similar to that of FIG. 1. The parts identical or similar to those of the laser device of FIG. 1 are represented by the same reference numerals. Thus, as in the case of the laser device of FIG. 1, the light generated in the laser medium 2 bounces back and forth between the totally reflective mirror 3 and partially reflective mirror 4 and thus is amplified within the laser resonator 1. The amplified light is outputted from the laser resonator 1 as the laser beam 7. Since the rough adjustment etalon 5 and fine adjustment etalon 6 are inserted within the laser resonator 1, the oscillation bandwidth of the laser beam is narrowed, and substantially monochromatic laser beam 7 can be obtained. A calculation means 26 determines the shift of the central transmission wavelength of the rough adjustment etalon 5. This determination is effected on the basis of the shift of the oscillation wavelength of the laser beam relative to the predetermined wavelength, which shift is detected by the first interference fringe detector 9. In accordance with the output of the calculation means 26, a second etalon control mechanism 27 controls the transmission wavelength of the rough adjustment etalon 5 by adjusting the gap length d, the sealing pressure, or the angle $\theta$ relative to the laser beam of the rough adjustment etalon 5. Otherwise, the organization is similar to that of the laser device of FIG. 1.

The control of the etalons for the stabilization of the laser beam is effected as follows.

Figure 3:
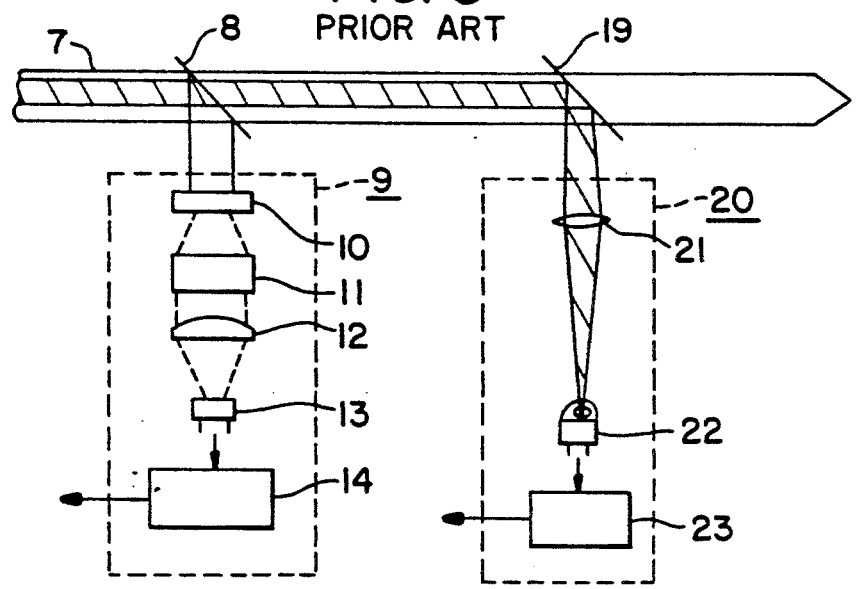
FIG. 3 shows the details of the etalon control mechanisms of the laser device of FIG. 1.
Figure 4A:
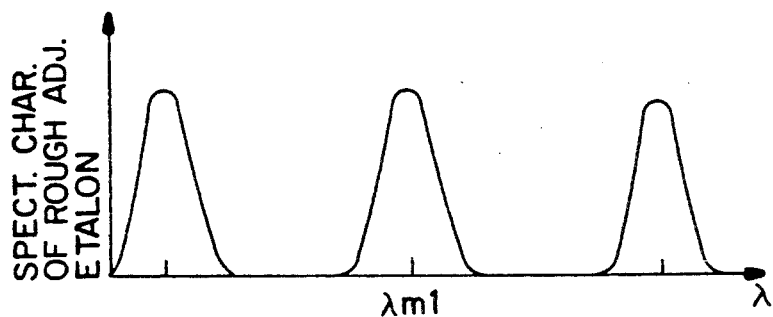
FIGS. 4a–4d shows the spectroscopic characteristics of the various parts of the laser device.
Figure 4B:
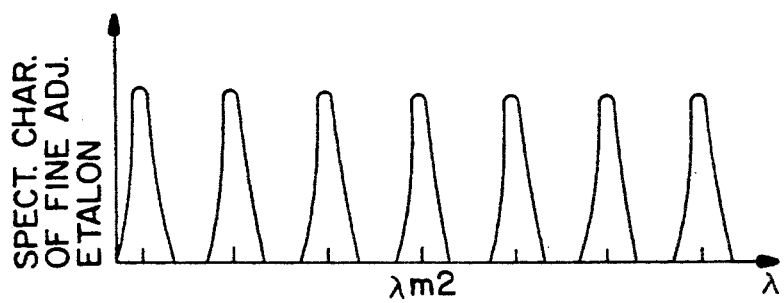
Figure 4C:
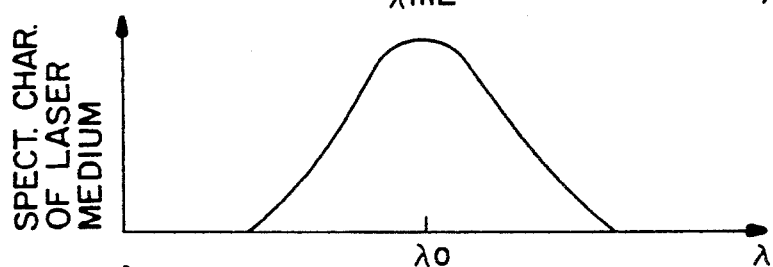
Figure 4D:
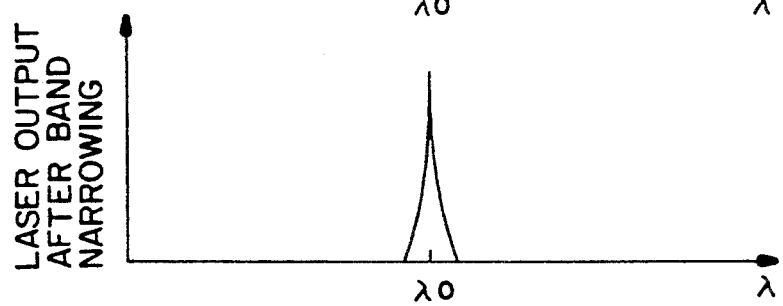

The method of control of the fine adjustment etalon 6 is similar to that of the laser device of FIG. 1. Thus, part of the laser beam 7 is guided to the first interference fringe detector 9 via the partially reflective mirror 8 and is diverged by the integrator 10 (see FIG. 3). Only the diverging components of the integrator 10 having particular incident angles to the etalon 11 are transmitted therethrough to reach the lens 12. When the focal length of the lens 12 is represented by f, the light having the incident angle $\theta$ is concentrated at positions separated from the lens axis by a radial distance $f\theta$, and thereby forms a circular interference fringe. The imaging element 13 detects the positions at which the light is concentrated, and the image processing unit 14 analyses the detected results, thereby obtaining the incident angle $\theta$, from which the current oscillation wavelength of the laser beam can be calculated. The oscillation wavelength of the laser beam is determined solely by the transmission characteristic of the fine adjustment etalon 6. Thus, the fine adjustment etalon 6 is adjusted, via the first etalon control mechanism 15, with respect to its angle to the laser beam, or its gap length d, such that the central transmission wavelength of the fine adjustment etalon 6 is tuned to the predetermined wavelength. The oscillation of the laser beam is thus adjusted to the predetermined wavelength.

On the other hand, the control of the rough adjustment etalon 5 is effected as follows. The oscillation wavelength of the laser beam measured by the first interference fringe detector 9 as described above is outputted to the calculation means 26. In response thereto, the calculation means 26 determines the shift of the oscillation wavelength of the laser beam with respect to the predetermined wavelength. The central transmission wavelength of the rough adjustment etalon 5 is calculated by the calculation means 26 from the value of the shift of the central transmission wavelength of the fine adjustment etalon 6 as described in detail hereinbelow. In response to the output of the calculation means 26, the second etalon control mechanism 27 controls the sealing pressure, the gap length d, or the angle relative to the laser beam, of the rough adjustment etalon 5, such that the central transmission wavelength of the rough adjustment etalon 5 is maintained to the predetermined wavelength of laser beam.

The details of the method of control of the rough adjustment etalon 5, in particular the method of operation of the calculation means 26, is as follows.

Figure 5:
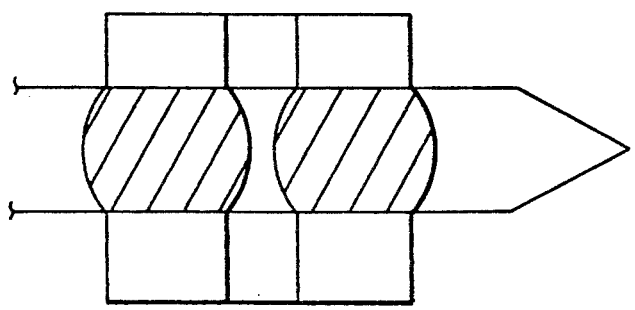
FIG. 5 is a sectional view of an etalon under thermal deformation.
Figure 6A:
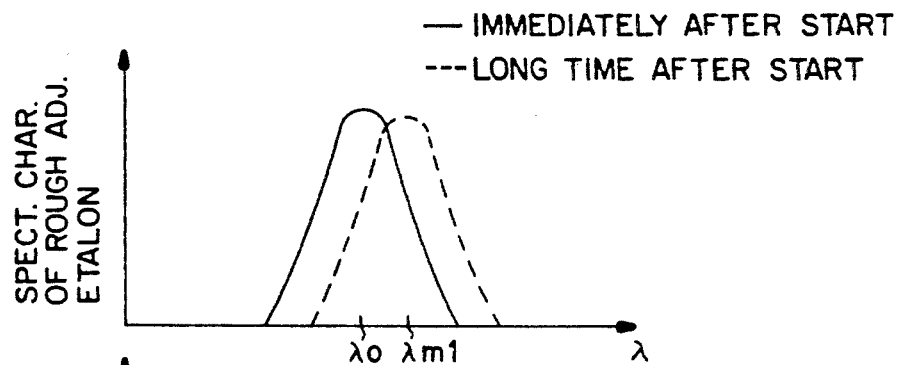
FIGS. 6a–6c shows the shifts of the spectroscopic characteristics of the etalons, etc., due to thermal deformations thereof.
Figure 6B:
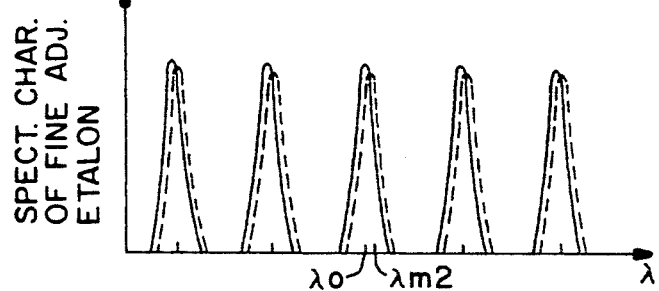
Figure 6C:
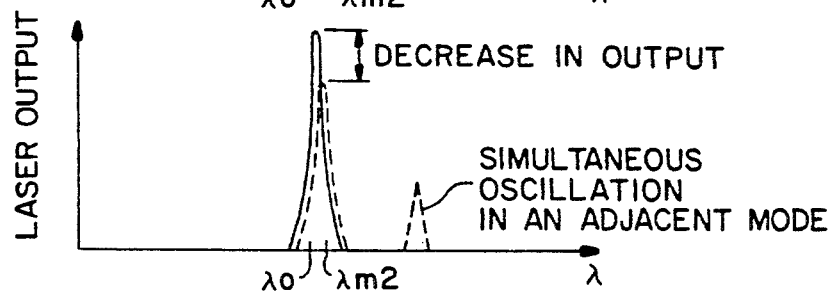
Figure 7:
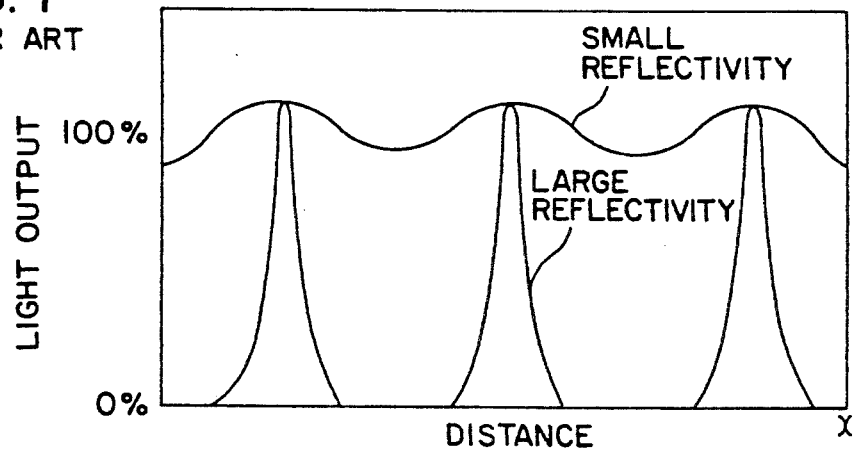
FIG. 7 shows the relation between the reflectivity of the etalon and the intensity of the interference fringes.
Figure 9:
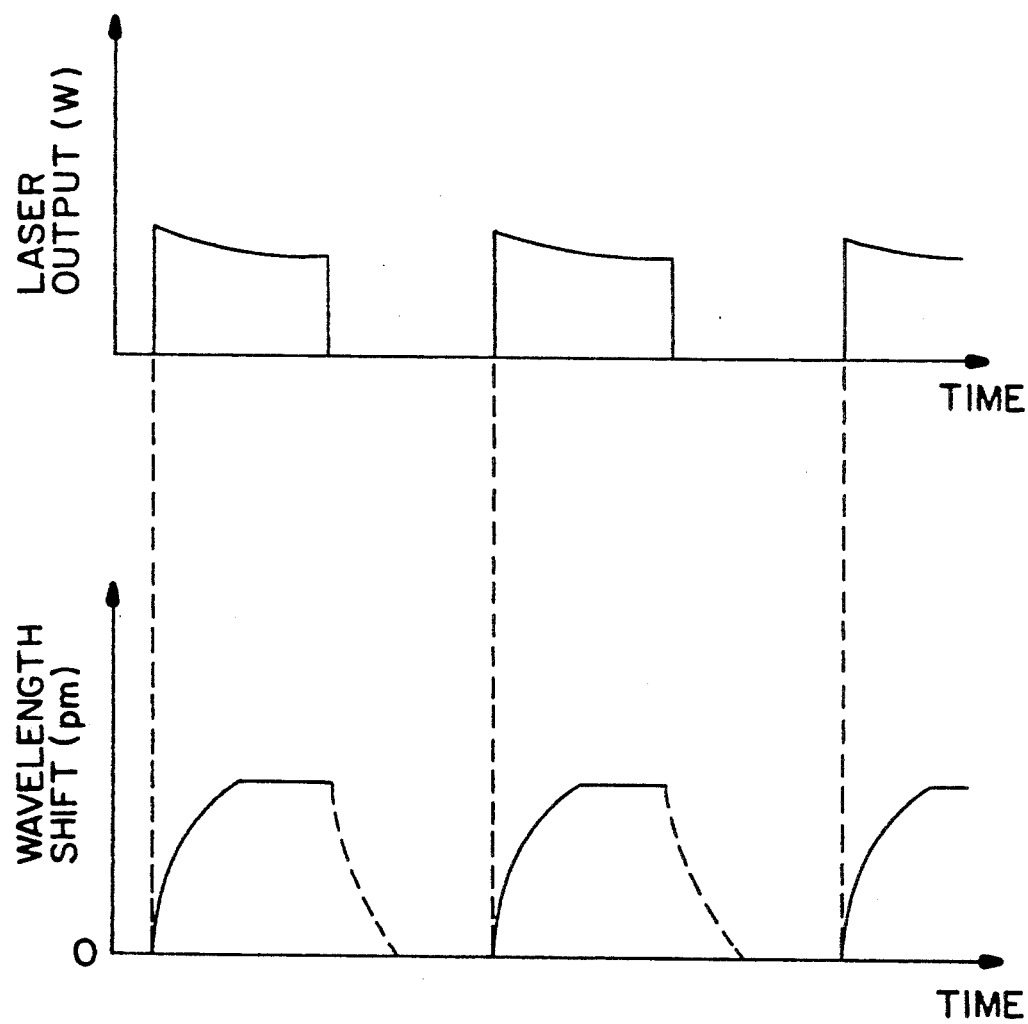
FIG. 9 shows the temporal variation of the laser output power and the wavelength shift.

The inventors have made researches into the relation which holds between the length of output time and the magnitude of shift of the oscillation wavelength of the laser beam relative to the predetermined wavelength. FIG. 9 shows the results of experiments that are conducted for the purpose of clarifying such relation. As shown in FIG. 9, the oscillation wavelength of the laser beam is shifted from the predetermined wavelength according to a predetermined curve after the start of oscillation of the laser beam, and returns to the predetermined wavelength soon after the oscillation is stopped. Wavelength shifts follow a regular pattern and do not take place at random. The wavelength shifts are caused by the thermal deformation of the etalons as shown in FIG. 5. Due to the heat generated by the laser beam going through the etalons, the etalons are deformed into the shape of a convex lens. Thus, the gap lengths of the fine adjustment etalon 6 and rough adjustment etalon 5 are changed, and hence the central transmission wavelength of the fine adjustment etalon 6 and rough adjustment etalon 5 are shifted from the predetermined wavelength. If the shift of the central transmission wavelength of the rough adjustment etalon 5 is represented by $\Delta\lambda_1$ and the shift of the gap length thereof by $\Delta d_1$, the relation between the two is given by the following equation (5):

$$\Delta\lambda_1/\lambda = \Delta d_1/d_1 \tag{5}$$

Further, the free spectral region $FSR_1$ of the rough adjustment etalon 5 is expressed by the following equation (6):

$$FSR_1 = \lambda^2/2nd \cos\theta_1 \tag{6}$$

Thus, the wavelength shift can be expressed by the following equation (7)

$$\Delta\lambda_1 = \Delta d_1 \, FSR_1/\lambda \tag{7}$$

Similarly, if the wavelength shift of the fine adjustment etalon 6 is represented by $\Delta\lambda_2$, it is expressed by the following equation (8):

$$\Delta\lambda_2 = \Delta d_2 \, FSR_2/\lambda \tag{8}$$

The variation $\Delta d$ of the gap length of the etalons is determined by the dimensions of the substrate plates of the etalons, the relevant physical constants, and the output power of the laser beam. Thus, if the plates of the two etalons 5 and 6 are designed identically, the variations $\Delta d_1$ and $\Delta d_2$ of the gap lengths of the rough adjustment etalon 5 and fine adjustment etalon 6 are made equal to each other. Then, the shift $\Delta\lambda_1$ of the central transmission wavelength of the rough adjustment etalon 5 can be expressed by the following equation (9):

$$\Delta\lambda_1 = (FSR_1/FSR_2)\,\Delta\lambda_2 \tag{9}$$

Thus, on the basis of this equation (9), the shift of the central transmission wavelength of the rough adjustment etalon 5 can be inferred from the ratio (FSR$_1$/FSR$_2$) of the free spectral regions of the rough adjustment etalon 5 and fine adjustment etalon 6 and the shift $\Delta\lambda_2$ of the central transmission wavelength of the fine adjustment etalon 6. By the way, the oscillation wavelength of the laser beam is, as noted above, determined solely by the central transmission wavelength of the fine adjustment etalon 6. Thus, the central transmission wavelength of the fine adjustment etalon 6 can be determined directly by measuring the oscillation wavelength of the laser beam by means of the first interference fringe detector 9. The wavelength of the laser beam measured by the first interference fringe detector 9 is outputted to the calculation means 26. In response thereto, the calculation means 26 obtains the shift of the oscillation wavelength of the laser beam relative to the predetermined wavelength, which shift corresponds to the shift of the central transmission wavelength of the fine adjustment etalon 6, as noted above. The shift of the central transmission wavelength of the rough adjustment etalon 5 is calculated therefrom in accordance with the above equation (9).

The calculation means 26 outputs to the second etalon control mechanism 27 the shift of the central transmission wavelength of the rough adjustment etalon 5 obtained as above. In response thereto, the second etalon control mechanism 27 tunes the central transmission wavelength of the rough adjustment etalon 5 to the predetermined wavelength by adjusting the gap length d, the sealing pressure, or the angle, of the rough adjustment etalon 5.

Further, when the oscillation of the laser beam is continued, thermal deformations are generated in the etalons as shown in FIG. 5, such that the oscillation wavelength of the laser beam is deviated from the predetermined wavelength as shown in FIG. 9. The shift of the central oscillation wavelength of the etalons occurs toward a predetermined direction. Thus, the control time required for attaining the maximum output power can be shortened by shifting, simultaneously with the start of oscillation, the central transmission wavelengths of the rough adjustment etalon 5 and the fine adjustment etalon 6 toward the direction to which the central transmission wavelengths should be shifted if no control is effected.

Furthermore, with respect to the embodiment, the case where the dimensions of the substrate plates constituting the rough adjustment etalon 5 and the fine adjustment etalon 6 or the values of the relevant physical constants are equal to each other for the two etalons has been described. When these values are different from each other for the two etalons, the variations $\Delta d_1$ and $\Delta d_2$ of the gap length of the fine adjustment etalon 6 and rough adjustment etalon 5 also take different values. Even under such circumstances, however, the shift of the central transmission wavelength of the rough adjustment etalon 5 can be inferred by modifying the above equation (9) by multiplying it with an appropriate correction factor. Thus, the central transmission wavelength of the rough adjustment etalon 5 can be controlled in a manner similar to the above.

Figure 10:
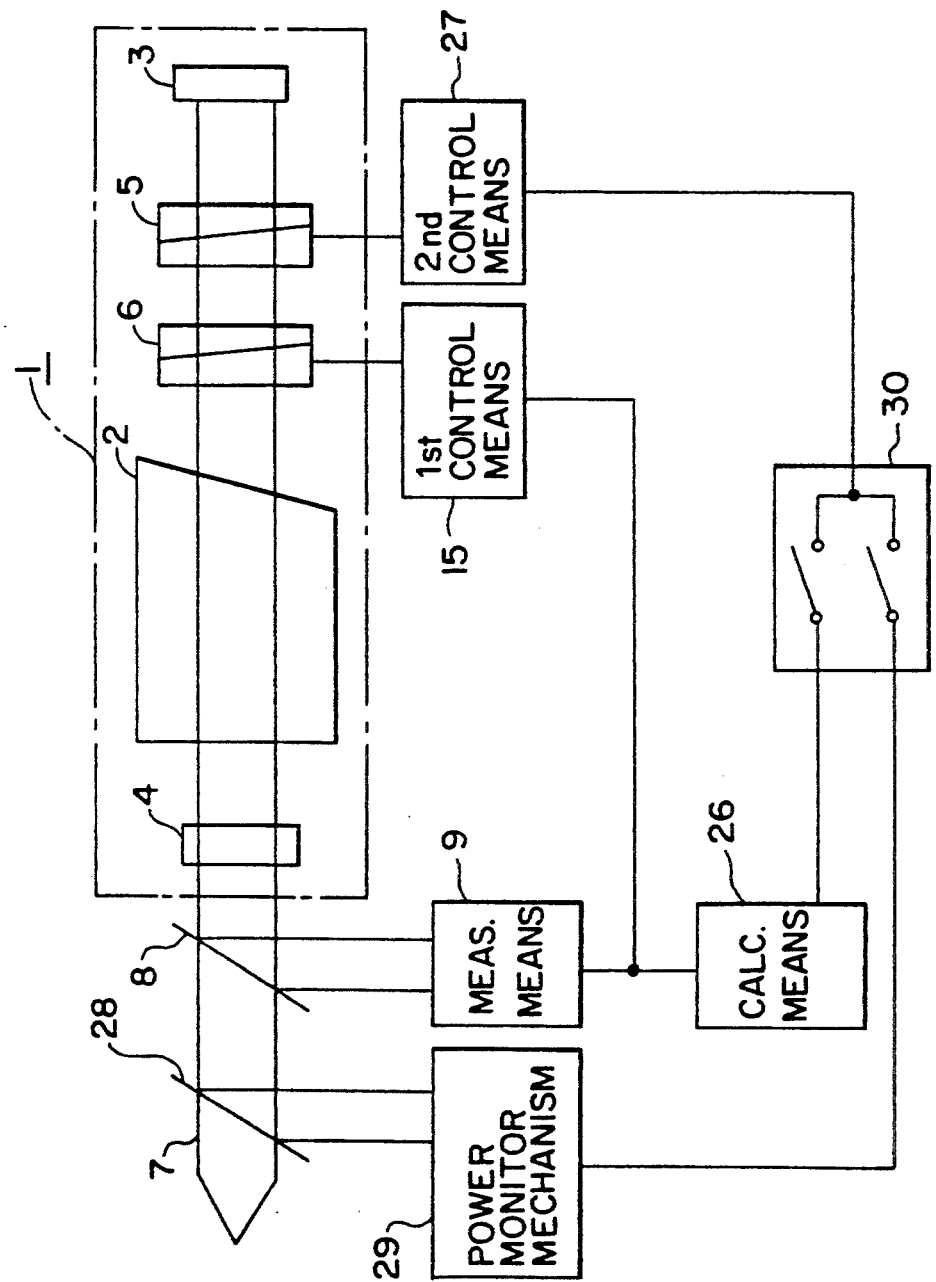
FIG. 10 is a view similar to that of FIG. 8, showing another embodiment according to this invention, which is provided with a power monitoring mechanism.

FIG. 10 shows another laser device according to this invention. In the case of this laser device, the shift of the central transmission wavelength of the rough adjustment etalon 5 caused by a factor other than the thermal deformation can also be adjusted. In FIG. 10, a second partially reflective mirror 28 reflects part of the laser beam 7 outputted from the laser resonator 1, and a power monitor mechanism 29 detects the output power of the laser beam by means of the light guided thereto via the second partially reflective mirror 28. The power monitor mechanism 29 consists of a unit for measuring the output power of the laser beam and another unit for recording the thus measured output power of the laser beam. The power monitor mechanism 29 judges whether the output of the laser beam increases or decreases upon control of the rough adjustment etalon 5 in either direction, and then determines, on the basis of the preceding judgment, in which direction and by what amount the rough adjustment etalon 5 is to be controlled. A selection control mechanism 30 controls the need or the priority of the signals from the power monitor mechanism 29 and the calculation means 26.

In the case of the laser device as described above, the wavelength of the laser beam is selected by the rough adjustment etalon 5 and fine adjustment etalon 6, and thus a laser beam narrowed in bandwidth is outputted. Further, after the start of laser beam oscillation, the central transmission wavelength of the rough adjustment etalon 5 and the fine adjustment etalon 6 are controlled. When the laser beam oscillation is stabilized thereafter, the selection control mechanism 30 is switched to the side of the power monitor mechanism 29, and the output power $P_0$ of the laser beam is measured and recorded by the power monitor mechanism 29. Next, the central transmission wavelength of the rough adjustment etalon 5 is slightly shifted by means of the second etalon control mechanism 27, and the output power P of the laser beam is measured again. The second measurement P of the output power is compared with the previous measurement $P_0$. When the two measurements are different from each other, the rough adjustment etalon 5 is controlled and adjusted by the second etalon control mechanism 27. The direction of adjustment is determined in accordance with whether $P > P_0$ or $P < P_0$ holds. This control operation is repeated until the output power of the laser beam reaches a stable maximum. As a result, laser beam of stabilized output power is outputted at a predetermined wavelength.

The above control operation is described in further detail. It has been pointed out that the thermal deformations of the rough adjustment etalon 5 and the fine adjustment etalon 6 caused by the heat generated by the laser beam give rise to temporary shifts of the central transmission wavelengths. This, however, is not the sole cause of the shifts of the central transmission wavelength of the etalons. Namely, the gap length of the etalons may be changed permanently by a long use or by a displacement of fixing positions caused, for example, by oscillations. Usually, these permanent shifts of the central transmission wavelength of the etalons do not occur simultaneously nor with equal magnitude for the rough adjustment etalon 5 and the fine adjustment etalon 6. Thus, there appears a separation between the central transmission wavelengths of the rough adjustment etalon 5 and the fine adjustment etalon 6. Under such circumstances, even if the central transmission wavelength of the etalons are controlled in accordance with the equation (9) as described above, the central transmission wavelength of the rough adjustment etalon 5 remains deviated from that of the fine adjustment etalon 6, and hence the output power of the laser beam is reduced.

According to the embodiment of FIG. 10, however, the central transmission wavelength of the rough adjustment etalon 5 is controlled, after the start of the oscillation, on the basis of the output of the power monitor mechanism 29 which measures the output power of the laser beam. Thus, the rough adjustment etalon 5 is first controlled by the second etalon control mechanism 27 to maximize the output power of the laser beam, and hence the central transmission wavelength of the rough adjustment etalon 5 is tuned to that of the fine adjustment etalon 6. Thereafter, the rough adjustment etalon 5 is controlled in accordance with the equation (9), with an appropriate correction which takes into consideration the difference in the central transmission wavelengths of the rough adjustment etalon 5 and the fine adjustment etalon 6 at the original non-controlled states. Thus, the embodiment of FIG. 10 is capable of adjusting not only the temporary shifts of central transmission wavelength caused by thermal deformations, but also the permanent shifts caused by other factors, and hence can generate a laser beam which is further stabilized in output power and oscillation wavelength.

Figure 11:
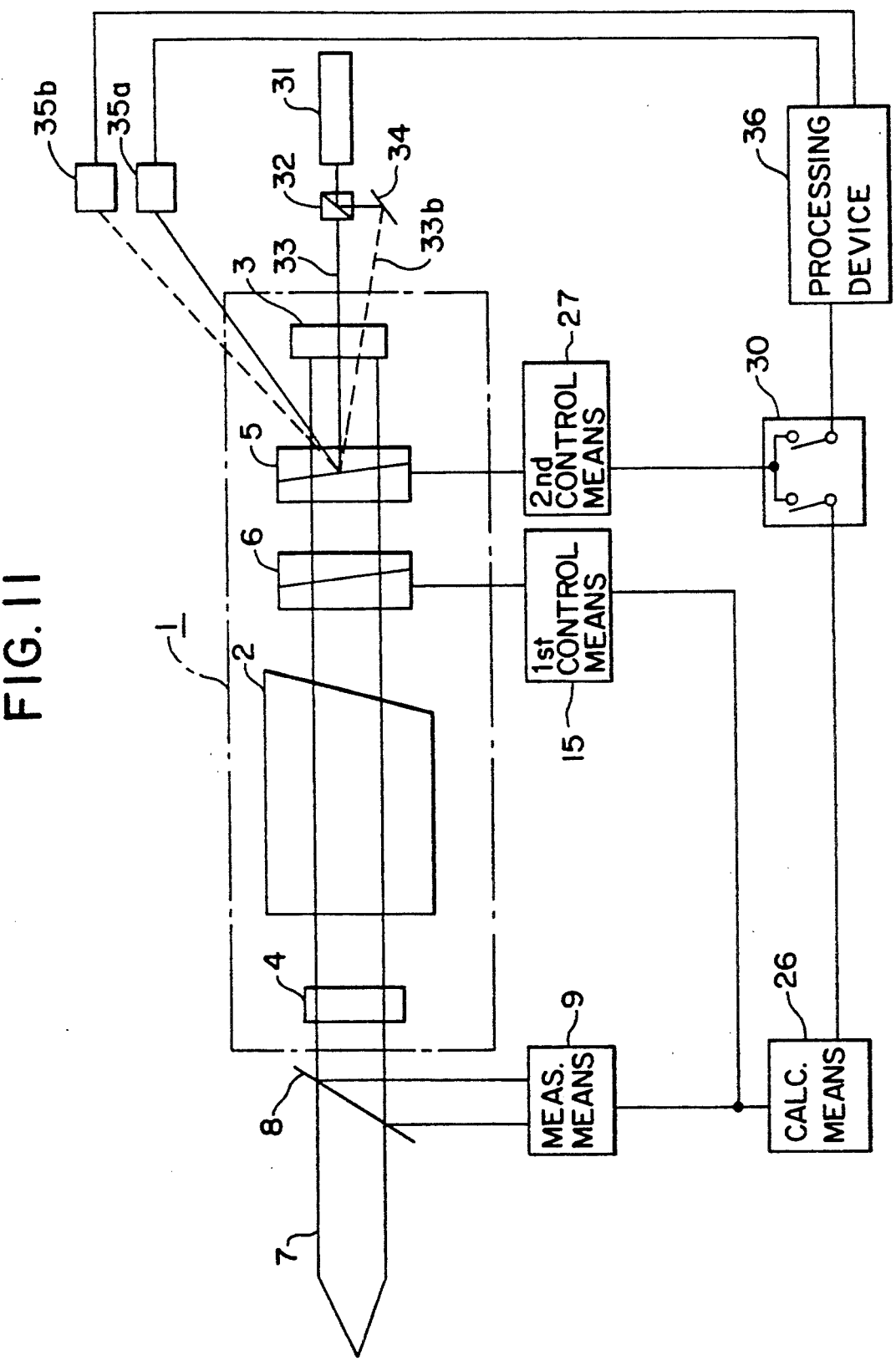
FIG. 11 is a view similar to that of FIG. 8, showing still another embodiment according to this invention.

Referring next to FIG. 11, still another embodiment according to this invention is described. The laser device of FIG. 1 adjusts the permanent shift of the central transmission wavelength of the laser device by a different method.

In FIG. 11, a light source 31, opposing the rough adjustment etalon 5 via the totally reflective mirror 3, emits light at a stable wavelength which is different from the oscillation wavelength of the laser resonator 1. For example, the light source 31 consists of the helium-neon (He-Ne) laser oscillating at the wavelength of 633 nm. The totally reflective mirror 3 has such a coating that is transparent to the wavelength of the helium-neon (He-Ne) laser. A beam splitter 32, disposed between the light source 31 and the totally reflective mirror 3, divides the light 33 emitted from the light source 31 into reflected and transmitted parts. The direction of the reflected light 33b is changed by a mirror 34 toward the rough adjustment etalon 5. The transmitted light 33a is transmitted through the totally reflective mirror 3, reflected by the rough adjustment etalon 5, and then is received by a first photosensor 35a. The first photosensor 35a detects the intensity of the light incident thereon. A second photosensor 35b detects the intensity of the light 33b which is incident thereon after being reflected by the rough adjustment laser 5. The light source 31 and the mirror 34, etc., are arranged in such a manner that the difference of the outputs of the first photosensor 35a and second photosensor 35b vanishes when the central transmission wavelength of the rough adjustment etalon 5 is tuned to the predetermined wavelength. A processing device 36 processes the signals outputted from the first photosensor 35a and second photosensor 35b.

The wavelength of the laser beam is selected by the rough adjustment etalon 5 and fine adjustment etalon 6, and thus a laser beam narrowed in bandwidth is outputted. Further, after the start of laser beam oscillation, the central transmission wavelength of the rough adjustment etalon 5 and fine adjustment etalon 6 are controlled. In addition, in the case of this embodiment, the permanent shift of the central transmission wavelength of the rough adjustment etalon 5 is adjusted during the oscillation cessation periods on the basis of the measurements of the variations of the intensity of the light detected by the first photosensor 35a and the second photosensor 35b.

Figure 2:
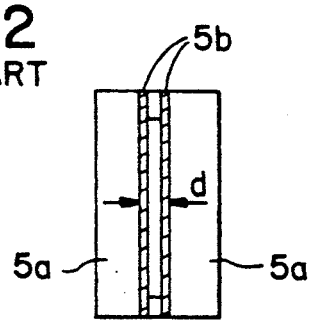
FIG. 2 shows the section of a etalon.
Figure 12:
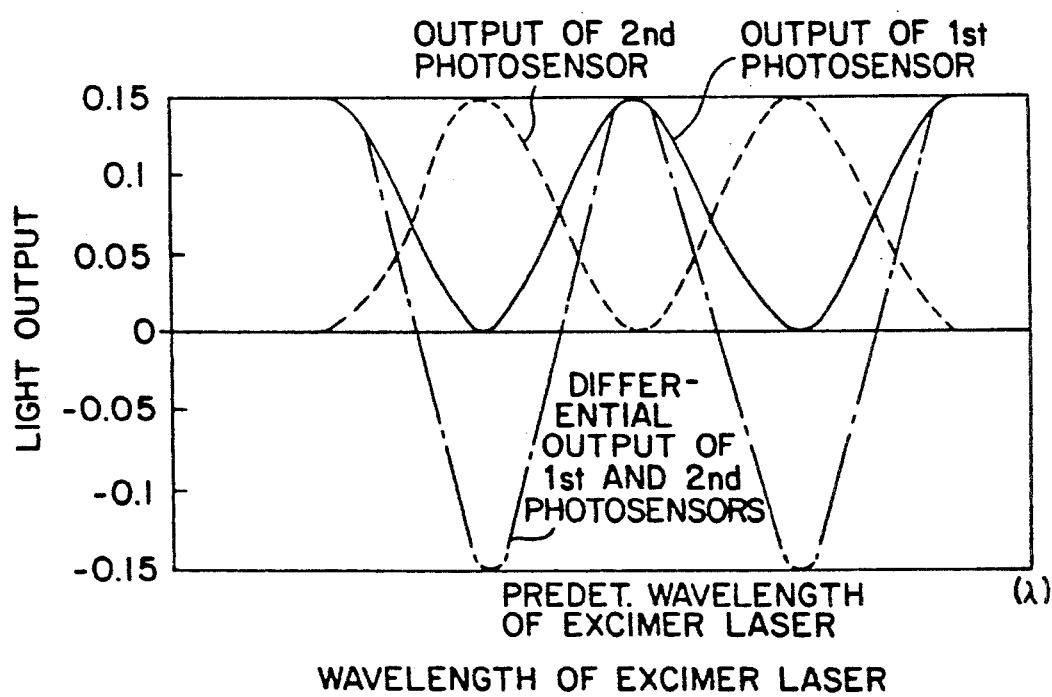
FIG. 12 shows the variation, with respect to the wavelength, of the outputs of the photosensors of the laser device of FIG. 11.

The method of controlling the rough adjustment etalon 5 during the laser output cessation periods is described by reference to FIGS. 2, 11 and 12, wherein FIG. 12 shows the relation between the outputs of the first photosensor 35a and second photosensor 35b. First, the helium-neon (He-Ne) laser light source 31 is activated and the helium-neon (He-Ne) laser light 33 emitted from the light source 31 is divided into the transmitted light 33a and reflected light 33b by the beam splitter 32. A part of the transmitted light 33a transmitted through the totally reflective mirror 3 is reflected by the reflective surfaces 5b of the rough adjustment etalon 5, and the intensity of the light reflected by the rough adjustment etalon 5 is detected by the first photosensor 35a. On the other hand, the reflected light 33b reflected by the beam splitter 32 is directed toward the rough adjustment etalon 5, and is reflected by the reflective surfaces 5b of the rough adjustment etalon 5. The intensity of the reflected light 33b is detected by the second photosensor 35b.

As shown in FIG. 12, the reflection light intensities detected by the first photosensor 35a and the second photosensor 35b vary with the change of the central transmission wavelength of the rough adjustment etalon 5. Thus, the central transmission wavelength of the rough adjustment etalon 5 can be determined from the measurements of the reflection light intensities. Since the incident angles of the lights 33a and 33b on the rough adjustment etalon 5 are different from each other, the outputs of the first photosensor 35a and the second photosensor 35b are shifted from each other, as shown in FIG. 12. The differential output of the first photosensor 35a and the second photosensor 35b (i.e., the difference between the outputs of the first photosensor 35a and the second photosensor 35b) is represented by a dot-and-dash curve in FIG. 12.

The outputs of the first photosensor 35a and the second photosensor 35b are supplied to the processing device 36, and the central transmission wavelength of the rough adjustment etalon 5 is controlled to the predetermined wavelength by adjusting the sealing pressure, gap length d, or the angle with respect to the laser beam, of the rough adjustment etalon 5.

This control of the rough adjustment etalon 5 during the laser output cessation periods can also be performed during the laser oscillation periods. However, since the light from a separate helium-neon (He-Ne) laser light source 31 is utilized for the control, error may arise when the light from the light source 31 suffers variations. Thus, after the start of the oscillation of the laser beam 7 itself, the control of the rough adjustment etalon 5 is preferred to be effected on the basis of the output of the calculation means 26, the switching being effected by the selection control mechanism 30. The rough adjustment etalon 5 can thus be controlled more precisely during the oscillation periods of the laser beam 7.

In summary, in the case of this embodiment, the central transmission wavelength of the rough adjustment etalon 5 caused by factors other than the thermal deformations is adjusted before the start of the oscillation of laser beam 7, and, after the start of oscillation of laser beam 7, the shift of the central transmission wavelength of the rough adjustment etalon 5 due to the thermal deformations is adjusted on the basis of the variations of the output power of the laser beam 7. Thus, a laser beam 7 the wavelength of which is stabilized to the predetermined wavelength can be obtained in a shorter time after the start of oscillation than in the case of the embodiment of FIG. 10.

Figure 13:
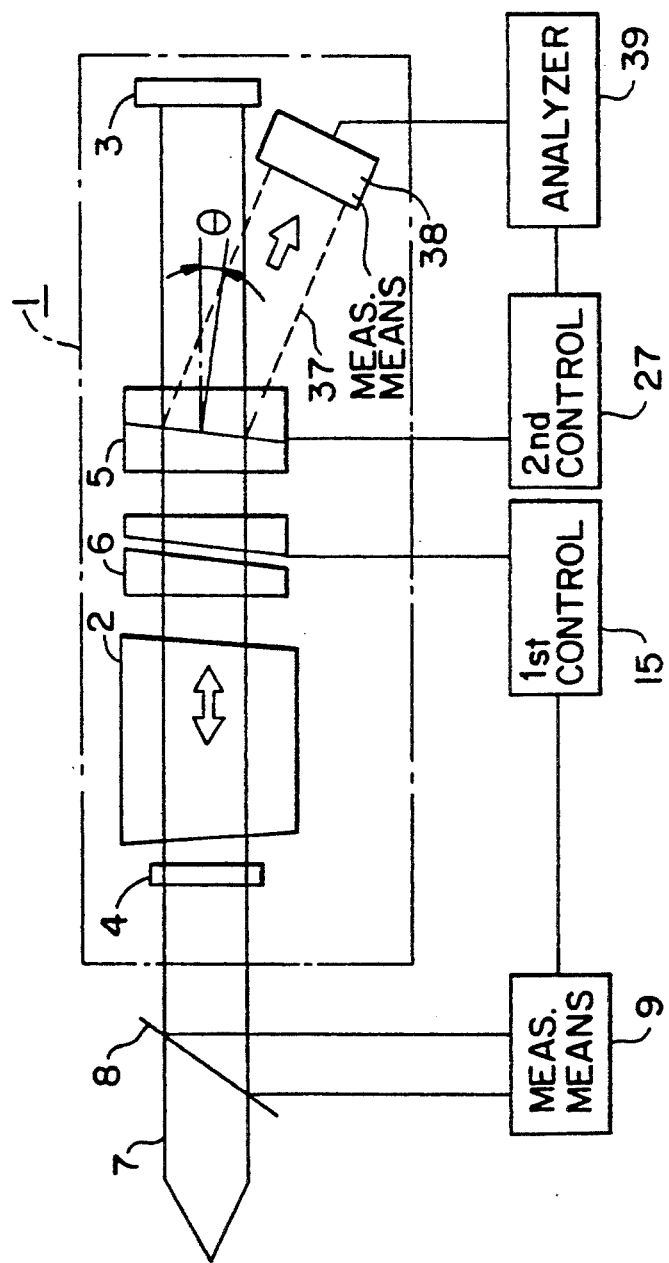
FIG. 13 is a view similar to that of FIG. 8, showing still another embodiment according to this invention.

Referring next to FIG. 13, still another embodiment according to this invention is described. In FIG. 13(a), the fine adjustment etalon 6 is controlled on the basis of the measurements effected by the first interference fringes detector 9, and the oscillation wavelength of the laser beam 7 is thus controlled to the predetermined wavelength. On the other hand, the rough adjustment etalon 5 is controlled by the second etalon control mechanism 27 on the basis of the measurements effected by a reflection light measurement means 38, which measures the reflection light 37 reflected by the rough adjustment etalon 5.

Figure 14:
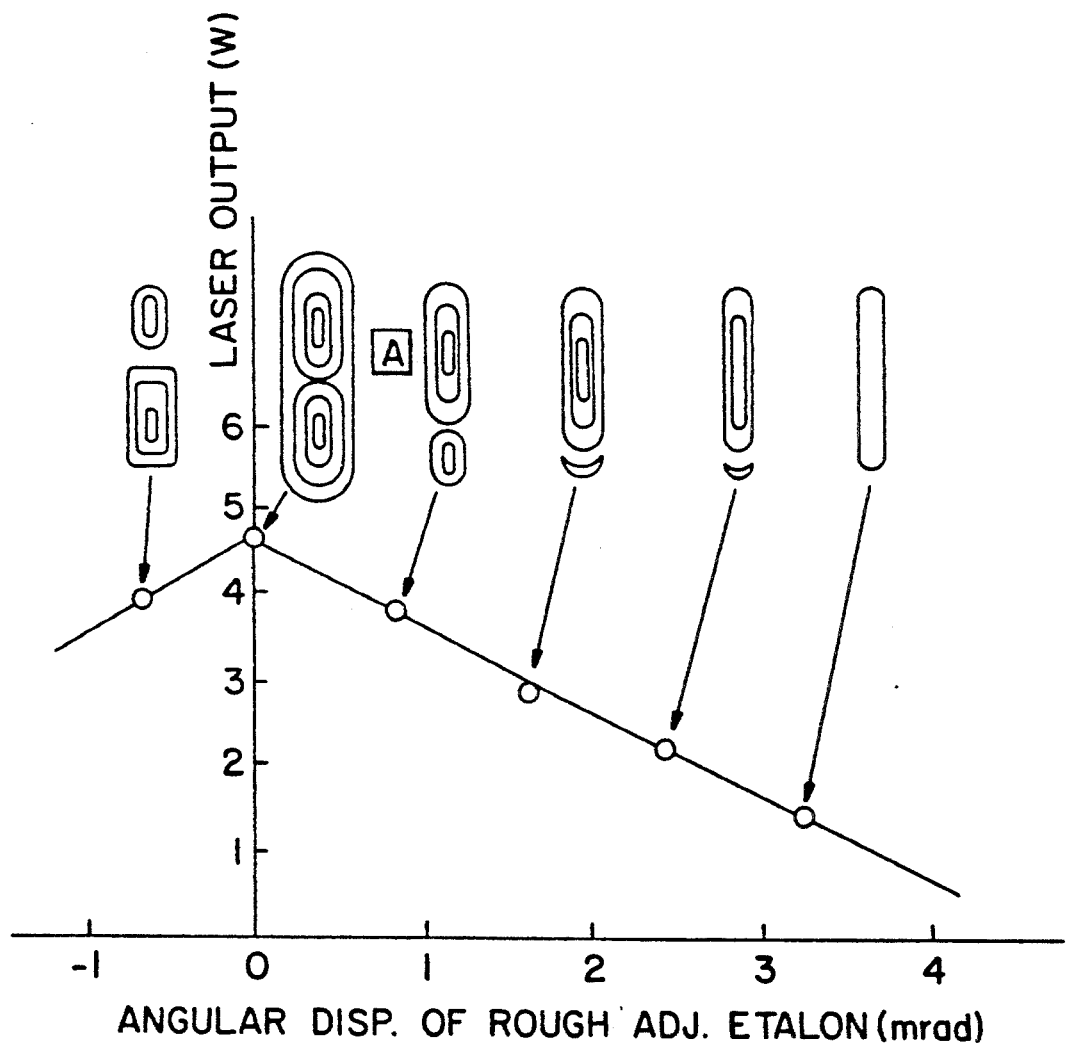
FIG. 14 shows the variations, relative to the tilt of the rough adjustment etalon, of the laser output power and the intensity of the reflected light of the laser device of FIG. 13.

FIG. 14 shows the principle of this control of rough adjustment etalon 5. As shown in FIG. 14, according as the angular displacement or tilt of the rough adjustment etalon 5, which is at 0 (zero) when the rough adjustment etalon 5 and the fine adjustment etalon 6 are tuned to each other, increases, the output power of the laser beam 7 decreases. As the same time, the intensity distribution of the reflection light, detected by the reflection light measurement means 38, changes as shown by contours in the figure. The low light intensity region, indicated by the reference character A in FIG. 14, appears at the center of the beam 37 when the rough adjustment etalon 5 and fine adjustment etalon 6 are tuned to each other. This phenomenon can be explained as follows.

If the laser beam 7 has no lateral extension, all the light must be transmitted through the rough adjustment etalon 5, and the intensity of the reflection light must be limited to a minimum. However, since the laser beam 7 has a substantial lateral extension, part of the laser beam 7 has a certain non-zero angle with respect to the optical axis of the laser resonator 1. When the rough adjustment etalon 5 and the fine adjustment etalon 6 are tuned to each other with respect to the main portion of the laser beam 7 proceeding along the optical axis, the tuning of the rough adjustment etalon 5 become inaccurate near the peripheral regions of the laser beam 7. Thus, the intensity of the reflection light 37 become stronger near the peripheral regions, and a dark portion A appears at the center of reflection light 37. When the tilting angle of the rough adjustment etalon 5 is changed, the tuning is deviated with respect to the main portion of the laser beam 7, and the tuned portion is translated toward the periphery in the lateral cross section of the laser beam. Thus, the dark portion A moves toward the periphery as the angular displacement or tilt of the rough adjustment etalon 5 increases.

The reflection light measurement means 38 detects the variations of this light intensity distribution. The reflection light measurement means 38 may be implemented by an image sensor as shown in FIG. 13(b), or by a two-partitioned photosensor as shown in FIG. 13(c). The result of the detection is analyzed by the analyzer device 39, and the rough adjustment etalon 5 is controlled by the second etalon control mechanism 27 is response to the output of analyzer device 39, so that the dark portion A would be positioned at the center. This method of control has the advantage that the direction and the magnitude of the necessary control can be determined instantaneously from the position of the dark portion A within the lateral cross section of the laser beam.

Figure 15:
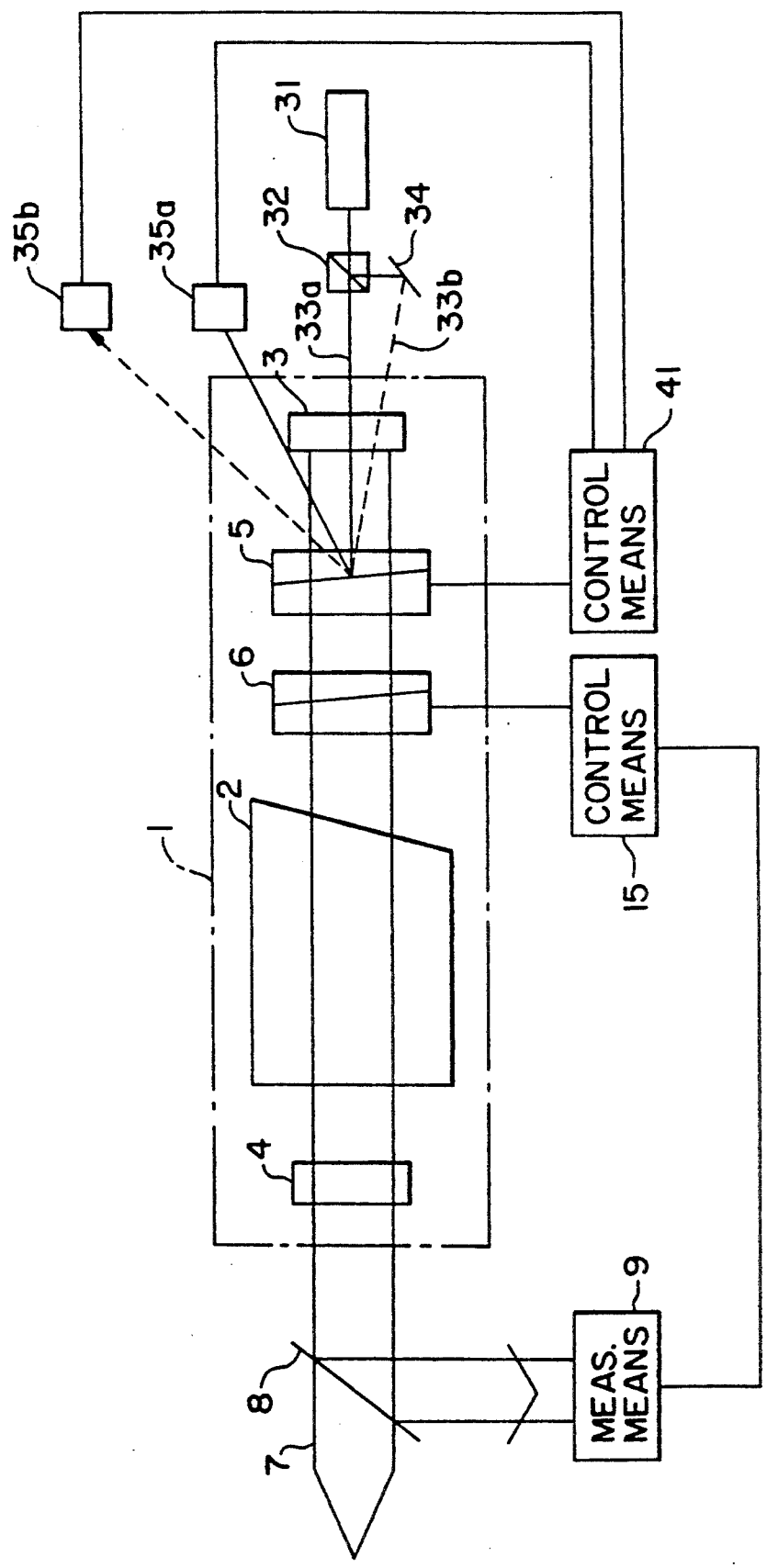
FIG. 15 is a view similar to that of FIG. 8, showing still another embodiment according to this invention.

Referring next to FIG. 15, a further embodiment is described.

In FIG. 15, the laser resonator 1 comprises a laser medium 2, a totally reflective mirror 3, and a partially reflective mirror 4, wherein the laser medium 2 consists of a krypton fluoride (KrF) excimer laser oscillating at the central wavelength of 248 nm. A light source 31, opposing the rough adjustment etalon 5 via the totally reflective mirror 3, emits light at a stable wavelength which is different from the oscillation wavelength of the laser resonator 1. For example, the light source 31 consists of the helium-neon (He-Ne) laser oscillating at the wavelength of 633 nm. The totally reflective mirror 3 has such a coating that is transparent to the wavelength of the helium-neon (He-Ne) laser. A beam splitter 32, disposed between the light source 31 and the totally reflective mirror 3, divides the light 33 emitted from the light source 31 into reflected and transmitted parts. The direction of the reflected light 33b is changed by a mirror 34 toward the rough adjustment etalon 5. The transmitted light 33a is transmitted through the totally reflective mirror 3, reflected by the rough adjustment etalon 5, and then is received by a first photosensor 35a. The first photosensor 35a detects the intensity of the light incident thereon. A second photosensor 35b detects the intensity of the reflected light 33b which is incident thereon after being reflected by the rough adjustment etalon 5. The light source 31 and the mirror 34, etc., are arranged in such a manner that the difference of the outputs of the first photosensor 35a and second photosensor 35b vanishes when the central transmission wavelength of the rough adjustment etalon 5 is tuned to the predetermined wavelength. A rough adjustment etalon control mechanism 41 controls the transmission wavelength of the rough adjustment etalon 5 by changing the gap length d, or the angle $\theta$ relative to the laser beam, of the rough adjustment etalon 5.

The light bounces back and forth within the laser resonator 1 and thus is amplified. Further, the light is narrowed in the bandwidth by the rough adjustment etalon 5 and the fine adjustment etalon 6. Thus, a substantially monochromatic laser beam 7 can be obtained. Further, for the stabilization of the oscillation wavelength of the laser beam, the etalons are controlled. The method of control of the fine adjustment etalon 6 is the same as described above with respect to the first embodiment. On the other hand, the method of control of the rough adjustment etalon 5 is as follows.

Since the output wavelength of the laser beam depends solely on the transmission wavelength of the fine adjustment etalon 6, some other means must be provided for measuring the transmission wavelength of the rough adjustment etalon 5. Thus, in the case of this embodiment, a laser light from a helium-neon (He-Ne) laser light source 31 having a wavelength different from that of the laser beam 7 is radiated on the rough adjustment etalon 5. The helium-neon (He-Ne) laser light 33 emitted from the light source 31 is divided into the transmitted light 33a and reflected light 33b by the beam splitter 32. A part of the transmitted light 33a is transmitted through the totally reflective mirror 3, which is coated with a layer sufficiently transparent to the wavelength of the helium-neon (He-Ne) laser. The transmitted light 33a transmitted through the totally reflective mirror 3 is reflected by the reflective surfaces 5b of the rough adjustment etalon 5, and the intensity of the light reflected by the rough adjustment etalon 5 is detected by the first photosensor 35a. On the other hand, the reflected light 33b reflected by the beam splitter 32 is directed toward the rough adjustment etalon 5, and is reflected by the reflective surfaces 5b of the rough adjustment etalon 5. The intensity of the reflected light 33b is detected by the second photosensor 35b. The outputs of the first photosensor 35a and second photosensor 35b are supplied to the rough adjustment etalon control mechanism 41. The first photosensor 35a and the second photosensor 35b are set in such a manner that the differential output of the first photosensor 35a and the second photosensor 35b (the difference between the outputs of the first photosensor 35a and second photosensor 35b) vanishes when the central transmission wavelength of the rough adjustment etalon 5 is tuned to the predetermined wavelength. Thus, in response to the outputs of the first photosensor 35a and second photosensor 35b, the rough adjustment etalon control mechanism 41 controls the rough adjustment etalon 5 so as to reduce the differential output of the first photosensor 35a and the second photosensor 35b to zero, by changing the gap length d, or the angle relative to the laser beam, of the rough adjustment etalon 5. Thus, the central transmission wavelength of the rough adjustment etalon 5 is controlled to the predetermined wavelength.

Next, the method of control of the rough adjustment etalon 5 is described in detail by reference to FIG. 16. If the reflectivity, with respect to the wavelength of the helium-neon (He-Ne) laser, of the reflective surfaces 5b facing the gap of the rough adjustment etalon 5 is represented by R, the ration B of the light reflected back to the first photosensor 35a is expressed by the following equation (10)

$$B = \{4R\sin^2(\delta_2/2)\}/\{(1-R)^2 + 4R\sin^2(\delta_1/2)\}$$

wherein
$$\delta_1 = 4\pi \, nd \cos \theta_1/\lambda$$

and
nd represents the optical gap length of the etalon;
λ represents the wavelength of the helium-neon (He-Ne) laser; and
$\theta_1$ represents the incident angle of the light from the helium-neon (He-Ne) laser light source 31.

On the other hand, the central transmission wavelength of the rough adjustment etalon 5 is represented by the equation (1). Thus, the ratio B of the reflection light reflected back to the first photosensor 35a depends on the variation of the central transmission wavelength of the rough adjustment etalon 5, and this ratio B is measured by the intensity of the light incident on the first photosensor 35a. Thus, on the basis of the measurements of the reflection light intensity on the first photosensor 35a, the central transmission wavelength of the rough adjustment etalon 5 can be determined. On the other hand, the ratio B of the light reflected back to the second photosensor 35b is expressed by an equation similar to the equation (10), although the incident angle $\theta_2$ is different from that for the first photosensor 35a.

Figure 16:
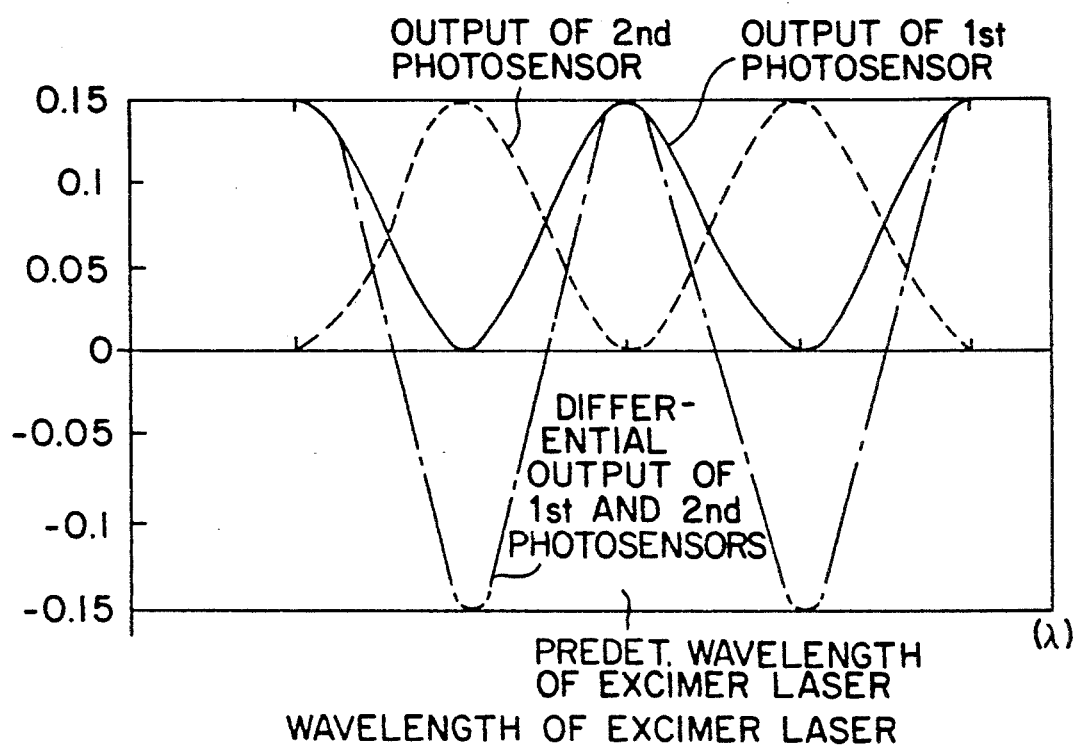
FIG. 16 shows the variation, with respect to the wavelength, of the outputs of the photosensors of the laser device of FIG. 15.

FIG. 16 shows the relation between the outputs of the first photosensor 35a and the second photosensor 35b, which is similar to that shown in FIG. 12. As in the case of the embodiment of FIG. 11, the second partially reflective mirror 28 is disposed such that the relation:

$$\delta_1 - \delta_2 = \pi/2$$

holds. Further as in the case of the embodiment of FIG. 11, the light source 31 and the mirror 34 are disposed in such a manner that the central transmission wavelength of the rough adjustment etalon 5 agrees with the predetermined wavelength of the excimer laser when the differential output of the first photosensor 35a and the second photosensor 35b, represented by the dot-and-dash curve in FIG. 16, vanishes. Thus, the rough adjustment etalon control mechanism 41 adjusts the rough adjustment etalon 5 such that the differential output of the first photosensor 35a and the second photosensor 35b will vanish, and the excimer laser is thereby stabilized to the predetermined wavelength.

This method of controlling the rough adjustment etalon 5 is applicable to the case where the reflectivity R is small, since the outputs of the first photosensor 35a and the second photosensor 35b can be amplified by respective amplifiers. Further, even when the characteristic of the etalon deteriorates due to a long service and the reflectivity thereof is reduced, the outputs of the first photosensor 35a and the second photosensor 35b decrease simultaneously. Thus, the position at which the differential output of the first photosensor 35a and the second photosensor 35b vanishes does not suffer a substantial shift. Thus, the central transmission wavelength of the rough adjustment etalon 5 can be controlled accurately to the predetermined wavelength.

The control of the rough adjustment etalon 5 according to the above method can be performed when the laser beam is not oscillated. Further, components such as the 21 and the imaging element 22 can be dispensed with. Furthermore, since the light from the helium-neon (He-Ne) laser 31 is radiated on the portion of the rough adjustment etalon 5 where the laser beam 7 actually passes, the method is convenient for observing the local thermal deformation of the rough adjustment etalon 5 caused by the excimer laser 7.

It is further noted that the variation of the output of the photosensors increases as the magnitude of the reflectivity R of the reflective surfaces 5b of the rough adjustment etalon 5 increases. Thus, the increase of the reflectivity R enhances the measurement precision. Further, the variation of the differential output of the first photosensor 35a and the second photosensor 35b, caused by the shift of the wavelength, can be increased by adjusting the incident angles $\theta_1$ and $\theta_2$ of the helium-neon (He-Ne) laser light on the rough adjustment etalon 5, thereby further enhancing the precision of the measurement of the transmission wavelength.

Further, the helium-neon (He-Ne) laser light source 31 may be implemented by a helium-neon (He-Ne) laser which is utilized for the adjustment of the laser resonator 1 in the production of the laser device. Thus, the production cost can be reduced.

Figure 17:
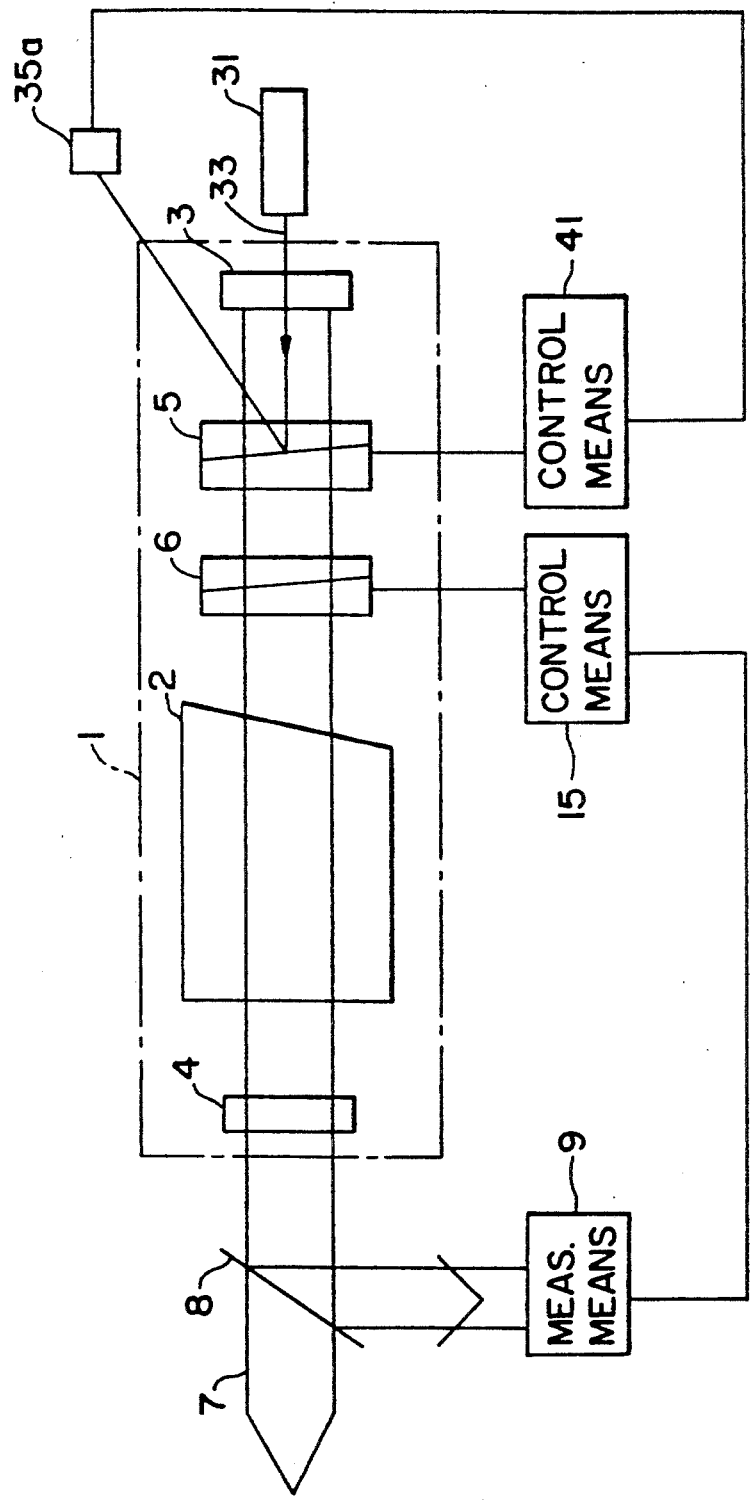
FIG. 17 shows a modification of the laser device of FIG. 15.

FIG. 17 shows the essential portion of still another embodiment according to this invention. The difference from the laser device of FIG. 15 is as follows. The first photosensor 35a and the second photosensor 35b are disposed near to each other. The beam splitter 32 for dividing the light of the light source 31 is not utilized, and instead of the beam splitter 32, a concave lens 42 is disposed between the light source 31 and the totally reflective mirror 3.

Figure 18:
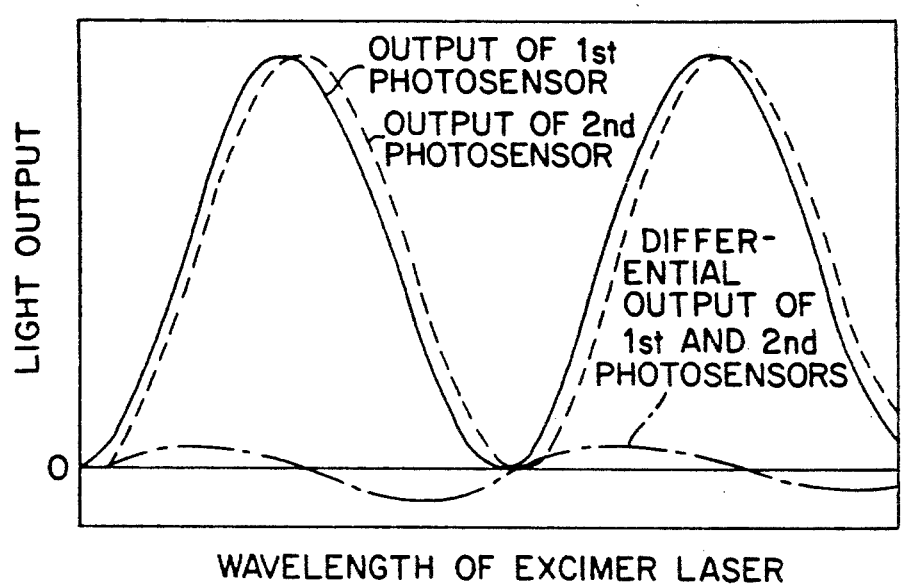
FIG. 18 is a graph showing the variation, with respect to the wavelength, of the outputs of the photosensors of the laser device of FIG. 17.

The method of operation of the laser device of FIG. 17 is as follows. Due to the diverging angle of the laser beams from the light source 31, the outputs of the first photosensor 35a and the second photosensor 35b, disposed proximate to each other, are differentiated. The rough adjustment etalon 5 is controlled on the basis of the differential output of the first photosensor 35a and the second photosensor 35b, in a manner similar to that described above. FIG. 18 shows the differential output of the first photosensor 35a and the second photosensor 35b. As in the case of the above embodiment, a zero crossing point of the differential output, represented by the dot-and-dash curve in FIG. 18, may be utilized for controlling the central transmission wavelength of the rough adjustment etalon 5. It is noted that the differential output of the first photosensor 35a and the second photosensor 35b is increased by extending the diverging angle of the laser beam by means of the concave lens 42. Thus, the measurement precision can be enhanced compared with the case where the concave lens 42 is not utilized.

FIG. 19 shows another modification of the embodiment of FIG. 15. In the case of this embodiment, only one photosensor 35a is utilized. The method of operation thereof is as follows. The light 33 from the helium-neon (He-Ne) laser light source 31 is reflected by the reflective surfaces 5b of the rough adjustment etalon 5 and then is received by the photosensor 35a. The intensity of the reflection light incident on the sensor 35a is determined in accordance with the above equation (10). The intensity of the reflection light at the time when the central transmission wavelength of the rough adjustment etalon 5 is tuned to the predetermined wavelength of the laser beam is stored in the rough adjustment etalon control mechanism 41, and the rough adjustment etalon control mechanism 41 controls the central transmission wavelength of the rough adjustment etalon 5 to the predetermined wavelength, by adjusting the gap length d or the angle of the rough adjustment etalon 5 relative to the laser beam, such that the intensity of light detected by the sensor 35a becomes equal to the stored value thereof. The control in the case where the gap length d of the rough adjustment etalon 5 is adjusted by the variation of the gas pressure is effected as follows.

Figure 20:
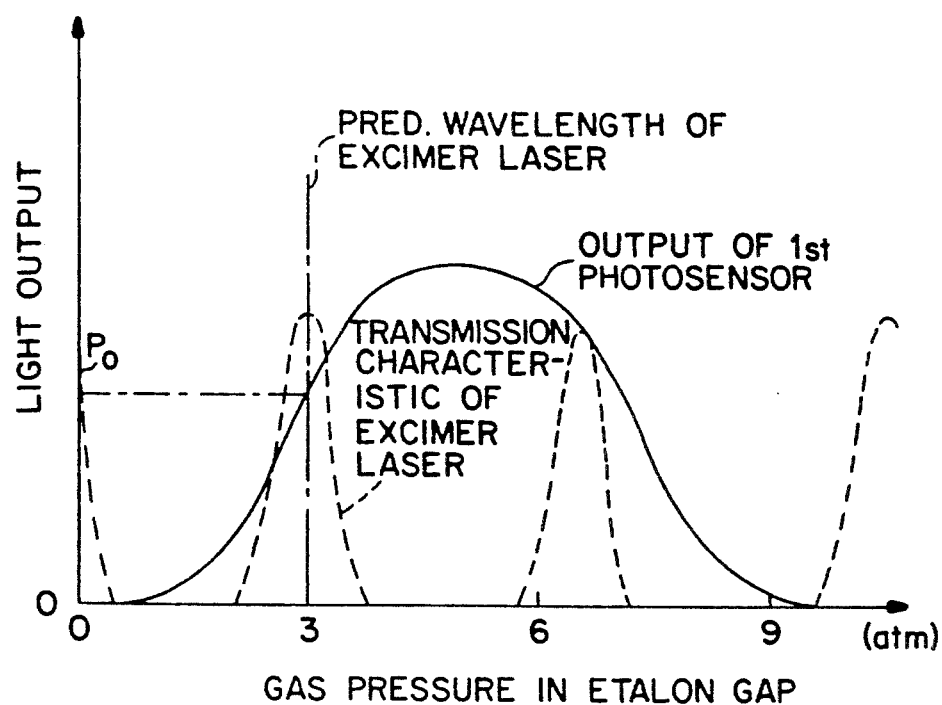
FIG. 20 shows the relation between the gas pressure in the etalon and the laser output.

FIG. 20 shows the reaction between the gas pressure on the etalon and the intensity of the reflection light. In the case where the wavelength of the excimer laser is adjusted to the predetermined wavelength at the gas pressure of 3 atm on the etalon, the intensity of light P detected at the gas pressure is the level to which it should be maintained. Thus, the central transmission wavelength of the rough adjustment etalon 5 is controlled to the predetermined wavelength by maintaining the intensity of the incident light on the sensor 35a to the level P. As a result, an excimer laser stabilized at the predetermined wavelength is outputted.

Figure 21:
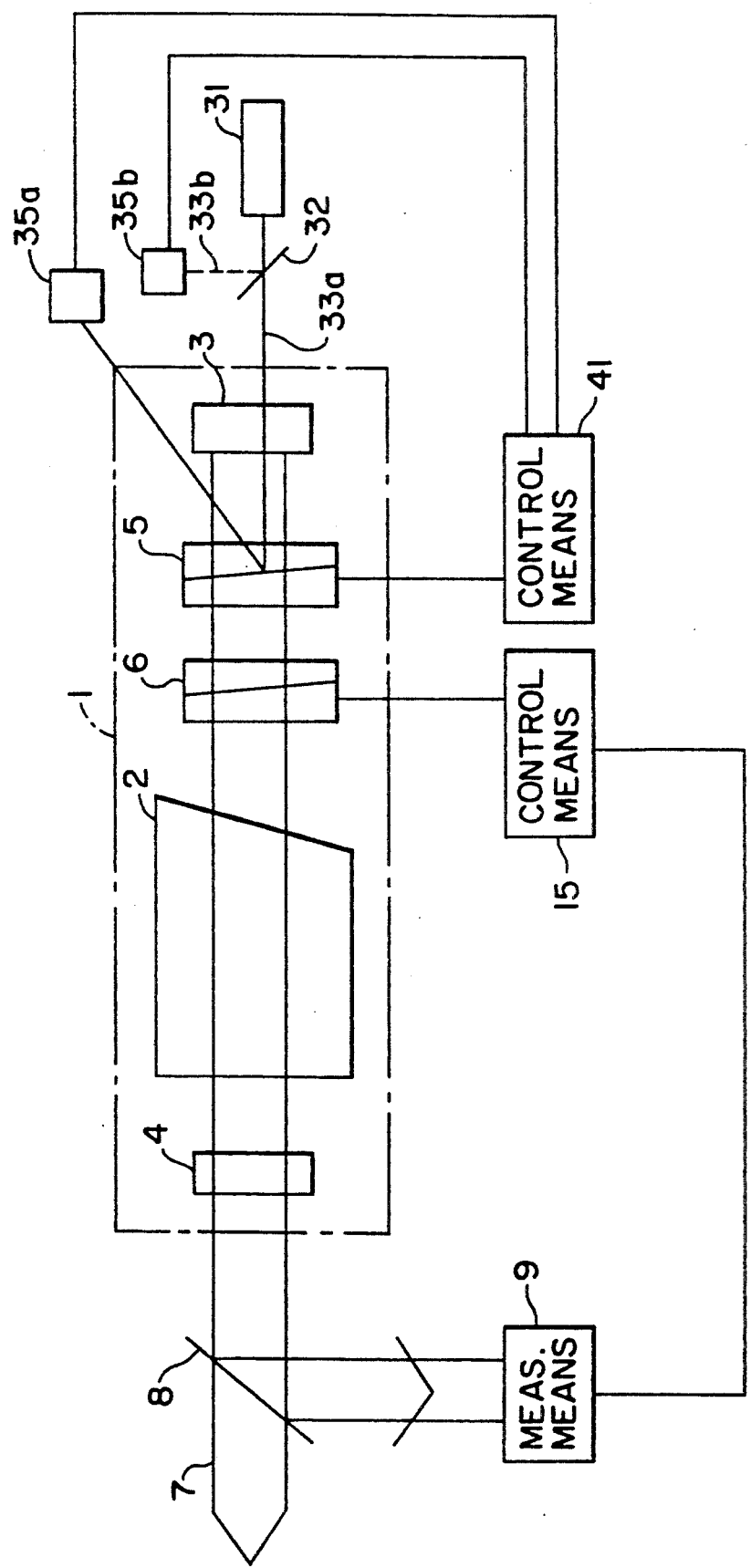
FIGS. 21 and 22 are views similar to that of FIG. 8, showing further embodiments according to this invention.

FIG. 21 shows still another modification of the embodiment of FIG. 15. In the case of this embodiment of FIG. 21, the light 33b reflected by the beam splitter 32 disposed between the light source 31 and the totally reflective mirror 3 is received directly by the second photosensor 35b. The light 33a transmitted through the beam splitter 32 is reflected by the rough adjustment etalon 5 and then is received by the first photosensor 35a. The output of the second photosensor 35b serves as a reference level for the output of the first photosensor 35a. Thus, even when the output power of the helium-neon (He-Ne) laser light source 31 varies due to the variations of the source voltage thereof and the intensity of the light incident on the first photosensor 35a is thereby changed, the output of the first photosensor 35a is normalized with reference to the output of the second photosensor 35b. The rough adjustment etalon 5 is controlled by the rough adjustment etalon control mechanism 41 on the basis of this normalized output of the first photosensor 35a. Thus, the control of the rough adjustment etalon 5 is not affected adversely by the variation of the output power of the light source 31. Thus, the laser device of FIG. 21 is capable of outputting a laser beam further stabilized in the oscillation wavelength compared with the case of the laser device of FIG. 19.

Figure 22:
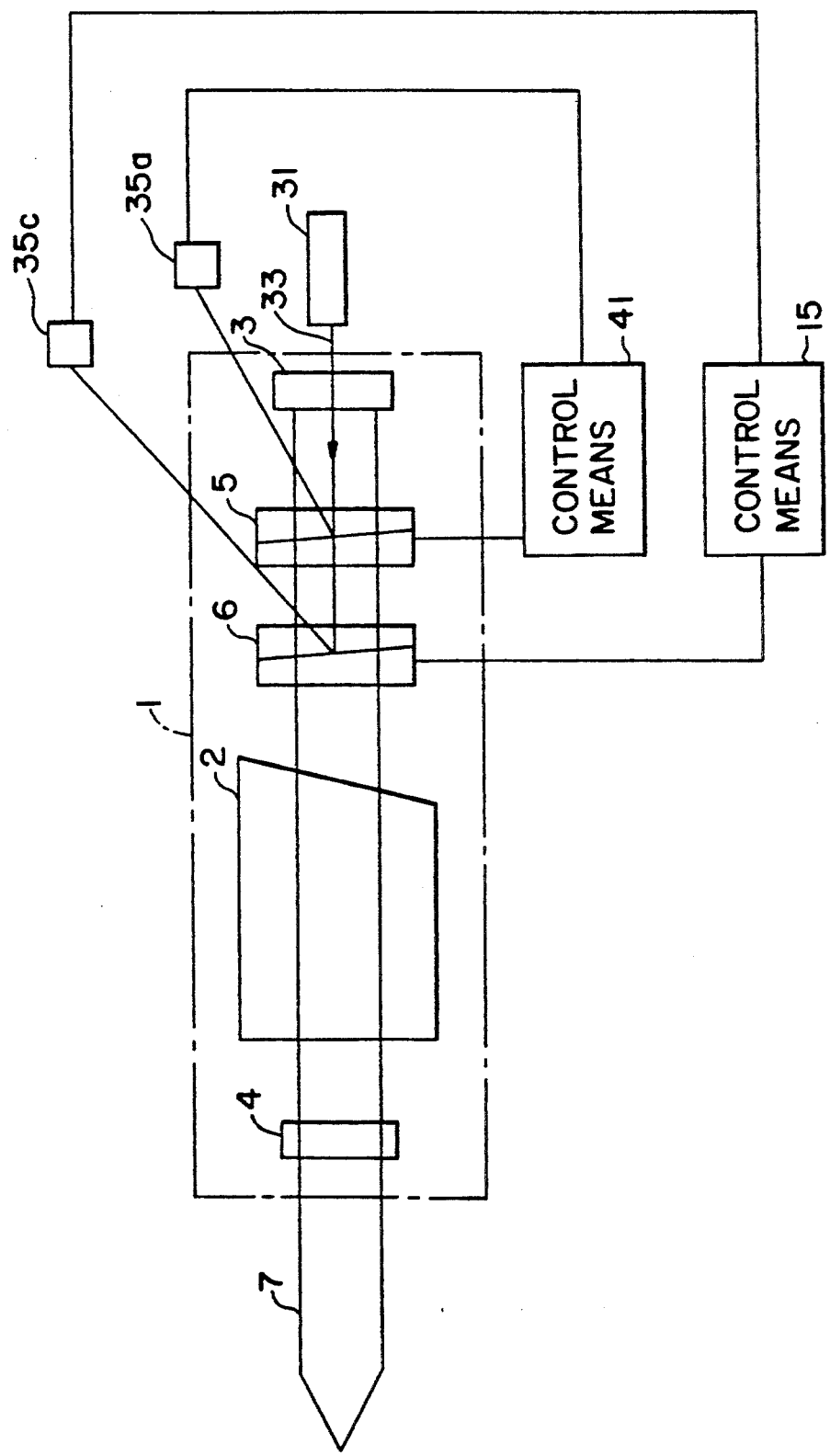

FIG. 22 shows still another embodiment according to this invention. The embodiment of FIG. 22 is similar to that of FIG. 19, except that a third photosensor 35c is provided which detects the intensity of light reflected by the reflective surfaces 5b of the fine adjustment etalon 6. In the case of this laser device, the control of the fine adjustment etalon 6 can also be effected by means of the light of the helium-neon (He-Ne) laser light source 31 in a manner similar to that for the rough adjustment etalon 5. The organization of the laser device can thus be simplified since the integrator 10 or the etalon 11 for forming the interference fringes can be disposed with.

In the case of the above embodiments, the light source 31 opposes the rough adjustment etalon 5 via the totally reflective mirror 3, and the light emitted from the light source 31 is radiated on the rough adjustment etalon 5 via the totally reflective mirror 3. However, the light source 31 may be disposed at a position radially displaced from the optical axis of the laser resonator 1, such that the light emitted from the light source 31 may be radiated directly on the rough adjustment etalon 5 from a tilted direction. In such case, it is not necessary that the wavelength of the light source 31 is differentiated from that of the laser beam 7.

What is claimed is:
1. A laser device comprising:
a laser resonator including a first and a second etalon having distinct transmission bandwidths, wherein a transmission bandwidth of the first etalon is narrower than a transmission bandwidth of the second etalon;
measurement means for measuring an oscillation wavelength of a laser beam outputted from said laser resonator;
first control means, coupled to an output of said measurement means, for controlling the transmission wavelength of the first etalon such that the oscillation wavelength of the laser beam detected by the measurement means is adjusted to a predetermined wavelength;
calculation means, coupled to an output of said measurement means, for calculating a shift of the transmission wavelength of the second etalon in response to a measurement of the oscillation wavelength of the laser beam effected by the measurement means; and
second control means, coupled to an output of the calculation means, for controlling the transmission wavelength of the second etalon to the predetermined wavelength in response to the output of the calculation means.
2. A laser device as claimed in claim 1, further comprising:
a power monitoring means for measuring the output power of the laser beam outputted from the laser resonator; and
selection control means for selectively supplying outputs of the calculation means and the power monitoring means to said second control means, said second control means controlling the second etalon in response to the selected output of the calculation means and the power monitoring means.

3. A laser device comprising:

a laser resonator including a first and a second etalon having distinct transmission bandwidths, wherein a transmission bandwidth of the first etalon is narrower than a transmission bandwidth of the second etalon;

a light source emitting light on at least one of said etalons;

photosensor means for detecting an intensity of light emitted from said light source and reflected by said one of the etalons; and control means, coupled to an output of said photosensor means, for controlling the transmission wavelength of said one of the etalons to a predetermined wavelength in response to the intensity of light detected by said photosensor means.

4. A laser device as claimed in claim 3, wherein said light source emits light at a wavelength different from an oscillation wavelength of a laser beam outputted from the laser resonator, said light source emitting light to said one of the etalons along an optical axis of said laser resonator via a totally reflective mirror of said laser resonator.

5. A laser device as claimed in claim 4, wherein said one of the etalons is said second etalon.

6. A laser device as claimed in claim 5, further comprising: dividing means for dividing the light emitted from the light source into two parts, and wherein said photosensor means comprises a first and a second photosensor for receiving the two divided parts of the light reflected by said second etalon, wherein a difference between outputs of said first and second photosensor vanishes when the transmission wavelength of said second etalon is adjusted to the predetermined wavelength, said control means controlling said second etalon so as to reduce the difference of the outputs of the first and second photosensor to zero.

7. A laser device as claimed in claim 6, wherein said dividing means comprises a beam splitter disposed between the light source and the totally reflective mirror of the laser resonator.

8. A laser device as claimed in claim 5, further comprising: diverging means for diverging the light emitted from the light source into two parts, and wherein said photosensor means comprises a first and a second photosensor for receiving the two diverged parts of the light reflected by said second etalon, wherein a difference between outputs of said first and second photosensor vanishes when the transmission wavelength of said second etalon is adjusted to the predetermined wavelength, said control means controlling said second etalon so as to reduce the difference of the outputs of the first and the second photosensor to zero.

9. A laser device as claimed in claim 8, wherein said diverging means comprises a concave lens disposed between the light source and the totally reflective mirror of the laser resonator.

* * * * *

UNITED STATES PATENT AND TRADEMARK OFFICE
CERTIFICATE OF CORRECTION

PATENT NO. : 5,130,998

DATED : July 14, 1992

INVENTOR(S) : Hitoshi Wakata et al.

It is certified that error appears in the above-identified patent and that said Letters Patent is hereby corrected as shown below:

Title Page [57], line 2 of the abstract, after "stabilization." insert --The rough adjustment etalon is controlled on the basis of the calculation that is effected by calculation means based on the measurement of the output wavelength of the laser beam.--

Col. 1, line 21 "Kohai" should be --Kokai--.

Col. 2, line 7 "form" should be --formed--.

Col. 2, line 32 "wavelength" should be --wavelengths--.

Col. 3, line 25 "turned" should be --tuned--.

Col. 3, line 26 "$\lambda_1$" should be --$\lambda_0$--.

UNITED STATES PATENT AND TRADEMARK OFFICE
CERTIFICATE OF CORRECTION

PATENT NO. : 5,130,998
DATED : July 14, 1992
INVENTOR(S) : Hitoshi Wakata et al.

It is certified that error appears in the above-identified patent and that said Letters Patent is hereby corrected as shown below:

Col. 4, line 35 "angel" should be --angle--.

Col. 13, line 21 "As" should be --At--.

Col. 13, line 53 "variations" should be --variation--.

Col. 15, line 34 "wherein" should be --where--.

Col. 17, line 38 "reaction" should be --relation--.

Signed and Sealed this

Thirtieth Day of November, 1993

BRUCE LEHMAN

*Attest:*

*Attesting Officer*  *Commissioner of Patents and Trademarks*